US012009583B2

(12) United States Patent
Terashita et al.

(10) Patent No.: US 12,009,583 B2
(45) Date of Patent: Jun. 11, 2024

(54) ANTENNA DEVICE

(71) Applicant: Yokowo Co., Ltd., Tokyo (JP)

(72) Inventors: Noritaka Terashita, Tomioka (JP); Motohisa Ono, Tomioka (JP); Yuki Kato, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 0 days.

(21) Appl. No.: 17/878,915

(22) Filed: Aug. 2, 2022

(65) Prior Publication Data

US 2022/0376385 A1 Nov. 24, 2022

Related U.S. Application Data

(63) Continuation of application No. 17/194,344, filed on Mar. 8, 2021, now Pat. No. 11,450,948, which is a
(Continued)

(30) Foreign Application Priority Data

Dec. 6, 2016 (JP) ................................ 2016-237147

(51) Int. Cl.
*H01Q 1/32* (2006.01)
*H01Q 1/22* (2006.01)
(Continued)

(52) U.S. Cl.
CPC ............ *H01Q 1/3275* (2013.01); *H01Q 1/22* (2013.01); *H01Q 1/32* (2013.01); *H01Q 1/36* (2013.01);
(Continued)

(58) Field of Classification Search
CPC .......... H01Q 1/32; H01Q 1/3275; H01Q 1/36; H01Q 1/42; H01Q 9/36; H01Q 21/28;
(Continued)

(56) References Cited

U.S. PATENT DOCUMENTS 8,189,613 B2 5/2012 Uejima
8,816,917 B2 8/2014 Ueno et al.
(Continued)

FOREIGN PATENT DOCUMENTS

CN 202651349 U 1/2013
CN 104752814 A 7/2015
(Continued)

OTHER PUBLICATIONS

Office Action dated May 22, 2023, in corresponding Chinese patent Application No. 202111019222.4, 9 pages.
(Continued)

*Primary Examiner* — Hoang V Nguyen
(74) *Attorney, Agent, or Firm* — XSENSUS LLP

(57) ABSTRACT

An antenna device includes: a planar antenna; and a metal body arranged a predetermined distance above the planar antenna, wherein the metal body is shifted in a predetermined direction with respect to the planar antenna, wherein the metal body is a metal plate and/or a parasitic element. The antenna device further includes an antenna which corresponds to a frequency band different from that of the planar antenna and a holder configured to maintain the predetermined distance between the planar antenna and the metal body, wherein the antenna is arranged in the predetermined direction.

10 Claims, 18 Drawing Sheets

Related U.S. Application Data continuation of application No. 16/425,981, filed on May 30, 2019, now Pat. No. 10,978,794, which is a continuation of application No. PCT/JP2017/037195, filed on Oct. 13, 2017.

(51) Int. Cl.

| | |
|---|---|
| ***H01Q 1/36*** | (2006.01) |
| ***H01Q 1/42*** | (2006.01) |
| ***H01Q 1/52*** | (2006.01) |
| ***H01Q 5/371*** | (2015.01) |
| ***H01Q 9/36*** | (2006.01) |
| ***H01Q 21/28*** | (2006.01) |

(52) U.S. Cl.

CPC ................. *H01Q 1/42* (2013.01); *H01Q 1/52* (2013.01); *H01Q 5/371* (2015.01); *H01Q 9/36* (2013.01); *H01Q 21/28* (2013.01)

(58) Field of Classification Search

CPC .. H01Q 1/22; H01Q 1/52; H01Q 1/12; H01Q 1/48; H01Q 5/371

See application file for complete search history.

(56) References Cited

U.S. PATENT DOCUMENTS

| | | | | |
|---|---|---|---|---|
| 8,836,604 | B2 | 9/2014 | Yang et al. | |
| 2008/0117111 | A1 | 5/2008 | Ikeda et al. | |
| 2012/0188143 | A1 | 7/2012 | Yang et al. | |
| 2013/0342405 | A1 | 12/2013 | Jeno et al. | |
| 2016/0064807 | A1* | 3/2016 | Reed | H01Q 21/28 343/749 |
| 2016/0315378 | A1 | 10/2016 | Kiriyama et al. | |
| 2017/0214112 | A1 | 7/2017 | Ohno et al. | |
| 2017/0214129 | A1 | 7/2017 | Ohno et al. | |

FOREIGN PATENT DOCUMENTS

| | | | | | |
|---|---|---|---|---|---|
| EP | 3091608 | A1 | | 11/2016 | |
| JP | 2010-21856 | A | | 1/2010 | |
| JP | 2012-34226 | A | | 2/2012 | |
| JP | 2012-161075 | A | | 8/2012 | |
| JP | 2013-110601 | A | | 6/2013 | |
| JP | 2014-33462 | A | | 2/2014 | |
| JP | 2015-84575 | A | | 4/2015 | |
| JP | 2016-032166 | A | | 3/2016 | |
| JP | 2016-174368 | A | | 9/2016 | |
| JP | 2018137652 | A | * | 8/2018 | H01Q 9/36 |
| WO | 2008/062746 | A1 | | 5/2008 | |
| WO | 2008/088040 | A1 | | 7/2008 | |
| WO | 2016/017247 | A1 | | 2/2016 | |

OTHER PUBLICATIONS

Office Action dated May 20, 2023, in corresponding Chinese patent Application No. 202111019576.9, 4 pages.

International Search Report dated Dec. 26, 2017 for PCT/JP2017/037195 filed on Oct. 13, 2017, 7 pages.

Extended European Search Report dated Jun. 3, 2020 in European Patent Application No. 17878524.2, 14 pages.

Office Action dated Sep. 21, 2021, in corresponding Japanese patent Application No. 2018-108630, 8 pages.

Japanese Final Office Action dated Jul. 11, 2023 in corresponding Japanese Patent Application No. 2022-069507, 3 pages.

* cited by examiner

ANTENNA DEVICE

CROSS-REFERENCE TO RELATED APPLICATIONS

This application is a continuation of U.S. application Ser. No. 17/194,344, filed Mar. 8, 2021, which is a continuation of Ser. No. 16/425,981, filed May 30, 2019 (now U.S. Pat. No. 10,978,794), which is a Continuation of International Patent Application No. PCT/JP2017/037195, filed on Oct. 13, 2017, which claims the benefit of Japanese Patent Application No. 2016-237147, filed on Dec. 6, 2016, the entire contents of each are incorporated herein by its reference.

BACKGROUND OF THE INVENTION

Field of the Invention

The present invention relates to an antenna device of a low profile type, which is to be mounted to a vehicle roof, and is capable of receiving radio waves for a plurality media.

Background Art

As conventional antenna devices to be mounted to a vehicle roof, or the like, there have been known types as disclosed in Patent Literatures 1 to 3. Each of those antenna devices includes an antenna case for accommodating an antenna unit and being protruded from the vehicle roof having a height of 70 mm or less. The antenna unit includes an antenna element configured to receive radio waves of a FM band, and a metal plate provided around a top of the antenna element in an umbrella shape to increase a gain of an AM band.

CITATION LIST

Patent Literature

[PTL 1] JP 2010-21856 A

[PTL 2] JP 2015-84575 A

[PTL 3] JP 2016-174368 A

In recent years, there is a tendency that multiple antennas for multiple media, such as a telephone antenna and a GPS antenna, in addition to an antenna for an AM broadcast and an FM broadcast, are incorporated in a single antenna case. Therefore, as the antenna devices disclosed in Patent Literatures 1 to 3, when the antenna element is provided as one large metal plate to reduce in size and height, antennas for other media are arranged to be close to each other.

Consequently, floating capacity is increased due to the antennas being adjacent to each other. The floating capacity is a reactive capacitance component which a designer does not intend to generate, and is caused by a physical structure. As the floating capacity is increased, the gain becomes lower. Further, even in antennas which are not adjacent to each other, it is liable to be affected by mutual antennas.

An antenna device to be mounted to a vehicle roof according to an aspect of the present disclosure includes: a case unit having an accommodating space formed therein and having a radio wave permeability; and an antenna unit to be accommodated in the accommodating space, wherein the antenna unit includes: a pair of capacitance loading elements facing across a plane, as a center, perpendicular to the vehicle roof at a predetermined interval and at a predetermined angle to each other; a coupling portion provided at a portion lower than an upper edge of the pair of capacitance loading elements to conduct each of the capacitance loading elements of the pair of capacitance loading elements each other via each of the coupling portions; and a helical element electrically connected to the coupling portions.

DESCRIPTION OF THE EMBODIMENTS

Hereinafter, description is made of the present disclosure which is applied to exemplary embodiments of antenna devices in a low height to be mounted on a vehicle roof. The antenna device includes a plurality types of antennas configured to receive, or to transmit and receive radio waves for a plurality of media.

In the following, for convenience, a vehicle roof side is referred to as a lower direction, an upper orientation perpendicular to the vehicle roof is referred to as an upper direction, a longitudinal direction of the present disclosure is referred to as front-back directions (a front surface is at a front, and a rear surface is at a rear), and a vertical direction with respect to the longitudinal direction is referred to as right-left directions. Further, upper-lower directions may be referred to as a front and a back respectively, or expressions similar to those may be used.

First Embodiment

Figure 1:
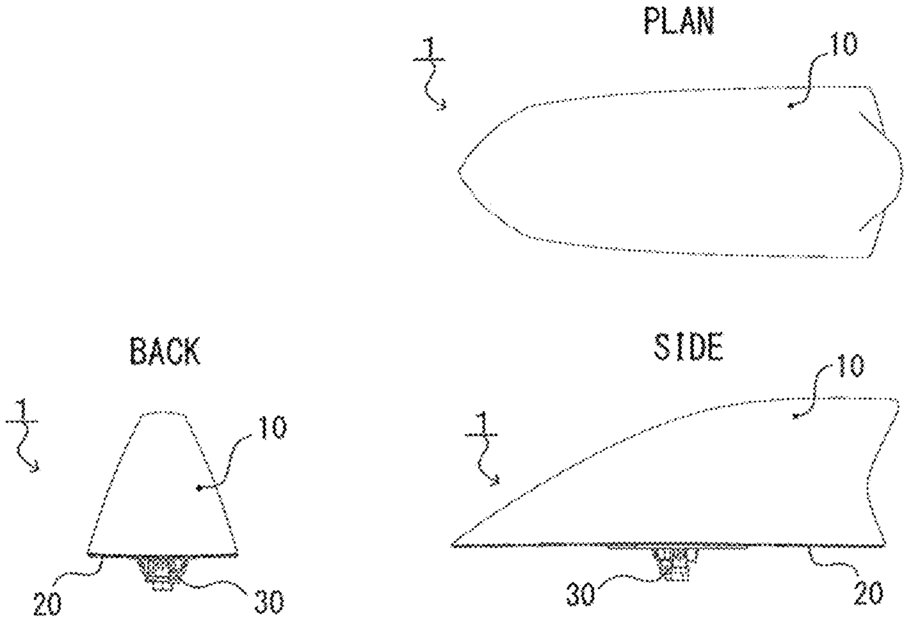
FIG. 1 shows external plan, side and back views of an antenna device according to a first embodiment of the present disclosure.

FIG. 1 shows a plan view, side view, and a rear view of an antenna device according to a first embodiment of the present disclosure. The antenna device 1 according to this embodiment includes a case unit, which is made of a synthetic resin having a radio wave permeability, and includes an accommodating space formed inside thereof, and an antenna unit which is accommodated in the accommodating space. The case unit includes an antenna case 10 having an opening surface portion at a lower surface side, and an inner case (not shown in the drawings). Further, the antenna device 1 includes a base unit 20 configured to close the opening surface portion of the antenna case 10, and a capture unit 30 configured to be mounted to the antenna device 1 to the vehicle roof and to be grounded.

The antenna case 10 is formed in a streamline shape to become thinner and lower as approaching a front (toward a tip end), and to have side surfaces having curved surfaces which are curved toward an inner side (toward a center axis in the longitudinal direction). A lower surface portion of the antenna case 10 is formed in a shape corresponding to a shape of a mounting surface (bottom surface of a portion on the vehicle roof side to which the antenna device 1 is mounted. The same is applied hereinafter) of the vehicle roof (not shown in the drawings). The antenna case 10 has a length of about 230 mm in the longitudinal direction, a width of about 75 mm, and a height of about 70 mm.

<Component Arrangement Structure>

Figure 2:
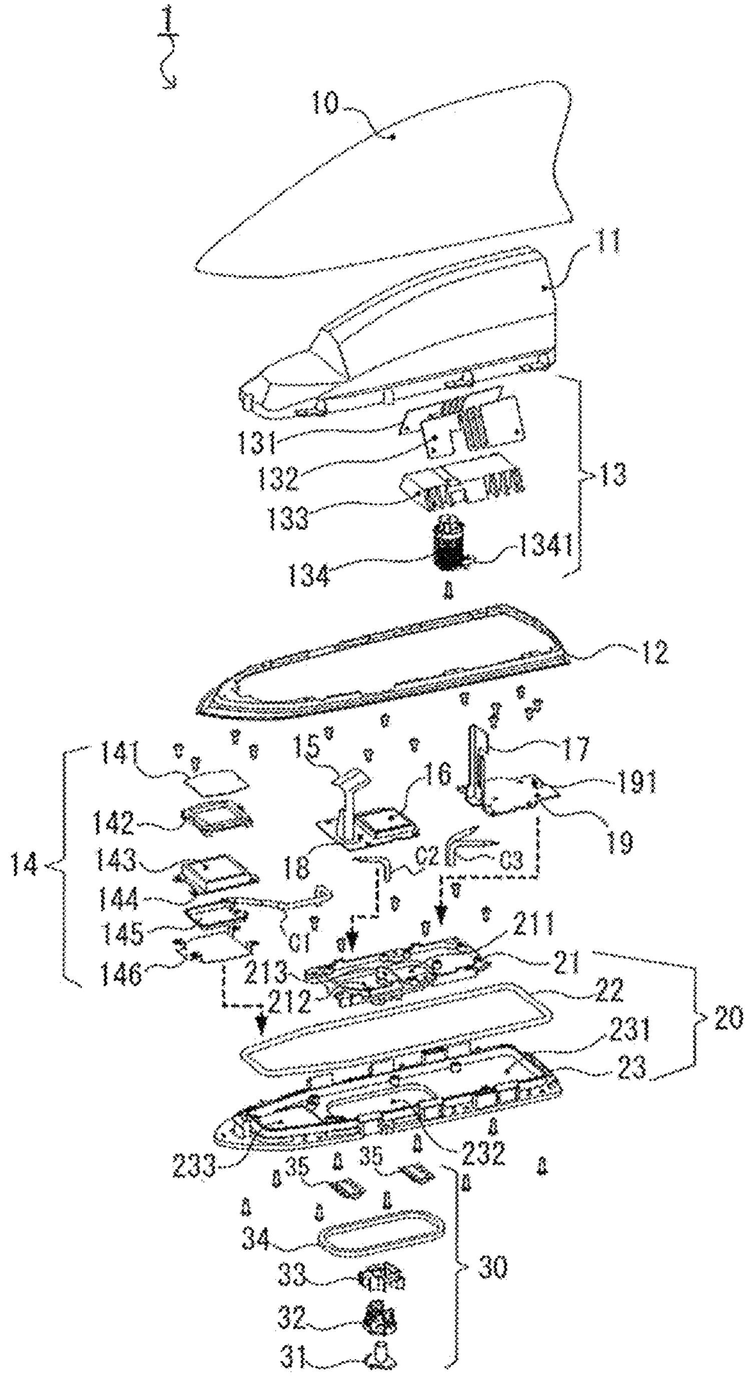
FIG. 2 shows an explanatory view of an arrangement of components forming the antenna device according to the first embodiment.

FIG. 2 shows an explanatory view of an arrangement of components of the antenna device 1. The antenna device 1 includes an inner case 11, an outer wall of which having a shape corresponding to a shape of an inner wall of the antenna case 10. The inner case 11 is made of a synthetic resin having a radio wave permeability, and a lower surface side is open. Further, in an outside flange in a lower surface portion thereof, a groove portion and a plurality of bosses are formed to be screwed to be fixed to the base unit 20.

The accommodating space described above is defined inside the inner case 11 to be used to protect antennas. Further, the inner case 11 is configured such that, when screwed to the base unit 20, an inner wall of the inner case 11 sandwiches and fixes an O-ring 22 with an outer wall of an inner rib of insulating walls of an insulating base 23. Therefore, dustproof and water proof properties inside the antenna device 1 are ensured.

When securing the antenna case 10 to the insulating base 23, an engaging piece made of a resin which is provided at an inner rear of the antenna case 10 is aligned to an engagement piece fitting portion of the insulating base 23. With the position of the engaging piece which is aligned as a support point, locking claws are respectively provided at a front and at a right and a left of the antenna case 10 and the insulating base 23 are engaged with each other. As a result, the antenna case 10 is fixed to the insulating base 23.

Further, fixing pieces are provided at right and left portions of the antenna case 10 in addition to the locking claws. Each of the fixing pieces has the structure to be inserted and assembled in a hole for the fixing piece formed in the insulating base 23. By providing the fixing pieces, a deformation of the antenna case 10 due to an external force received by the antenna case 10 can be prevented. Further, by providing the fixing pieces, the external force applied to the antenna case 10 is dispersed to the fixing pieces. Consequently, the external force transmitted to the locking claws is decreased, and disengagement between the locking claws can be prevented.

A pad 12, which is soft and is made of a soft insulating material, is mounted between an outer edge of the lower surface portion of the inner case 11 and an opening end portion of the antenna case 10. The pad 12 is, when the antenna case 10 is fixed to the base unit 20, sandwiched therebetween and fixed. The pad 12 closes a gap between the vehicle roof, and the antenna case 10 and the inner case 11. As a result, dustproof and waterproof properties can be improved as well as an appearance. In particular, because of the pad 12, water is prevented from being sprayed directly to the sealing member 34 during water discharge in an automobile washing machine. Therefore, the pad 12 serves for improving a waterproof property of a sealing member 34.

An AM/FM antenna 13, a Satellite Digital Audio Radio Service (SDARS) antenna 14, an LTE antenna 15, a GNSS antenna 16, and a telephone antenna 17 are mounted in the accommodating space of the inner case 11. The AM/FM antenna 13 receives AM broadcast radio waves between 522 kHz to 1710 kHz and FM broadcast radio waves between 76 MHz to 108 MHz. Further, LW broadcast waves between 153 kHz to 279 kHz can be received. The SDARS antenna 14 configured to receive circularly polarized waves receives radio waves in 2.3 GHz band which is served in a satellite digital audio radio service. The Long Term Evolution (LTE) antenna 15 transmits and receives radio waves between 700 MHz band to 2.7 GHz band. A Global Navigation Satellite System (GNSS) is a generic term for a satellite positioning system such as a GPS, a GLONASS, a Galileo, and a quasi-zenith satellite (QZSS). The GNSS antenna 16 configured to receive circularly polarized waves receives radio waves in around 1.5 GHz band of the GNSS. The telephone antenna 17 transmits and receives radio waves between 700 MHz band and 2.7 GHz band. The telephone antenna 17 is, in fact, is a kind of the LTE antenna.

The AM/FM antenna 13 is, while being screwed to be fixed to inner wall bosses of the inner case 11, elastically held by an M-shaped connecting piece 191 which is an elastic conductive member formed on a substrate 19. The SDARS antenna 14 is screwed to and held by the insulating base 23. The LTE antenna 15 and the GNSS antenna 16 are fixed to a conductive base 21 through intermediation of a substrate 18. The telephone antenna 17 is fixed to the conductive base 21 through intermediation of the substrate 19. Signals received by each antenna 13 to 17 and amplified are sent through signal cables C1, C2, and C3 to electronic circuits on the vehicle side.

The AM/FM antenna 13 includes a pair of capacitance loading elements 131 and 132, a holder 133 made of a synthetic resin having a radio wave permeability, and a helical element 134. The capacitance loading elements 131 and 132 are elements, each having an electrical delay unit at approximately a central portion, and, for example, having a composite shape formed in a meandering shape, and does not resonate by itself in the AM/FM band. However, capacitance loading elements 131 and 132 function as capacitance loading plates which add (load) capacitance to ground to the helical element 134, improves a function as voltage receiving elements in the AM band, and causes the AM/FM antenna 13 to resonate in the FM band. Further, in frequencies other than the AM band and the FM band, the capacitance loading elements 131 and 132 serve as impedance converters to be described later. The helical element 134 is interposed between the capacitance loading elements 131, 132 and an AM/FM amplifier circuit, and operates as a helical antenna which resonates in the FM band in cooperation with the capacitance loading elements 131 and 132. The helical element 134 is formed by a hollow bobbin wound with a linear conductor, and has terminals which are respectively formed to be conductive to end portions of the linear conductor (in the example illustrated in FIG. 2, a lower terminal 1341) at an upper end and a lower end thereof. A lower terminal 1341 is elastically held by the M-shaped connecting piece 191 described above. The structure of the AM/FM antenna 13 is described later in detail.

The SDARS antenna 14 includes a parasitic element 141, a parasitic element holder 142, a planar antenna 143, an SDARS amplifier substrate 144, a shield cover 145, and a ground plate 146. The planar antenna 143 is a main antenna for the SDARS, and the parasitic element 141 in a meal thin plate shape is provided to improve an antenna gain of the planar antenna 143 on an upper side of the planar antenna 143 at a predetermined interval. The shield cover 145 formed by a metal thin plate in a box shape is a conductive member configured to electrically shield the SDARS amplifier substrate 144. The ground plate 146 is a conductive member to be a ground (grounded portion, the same is applied hereinafter) of the planar antenna 143. The shield cover 145 may be integrated with the ground plate 146. The SDARS antenna 14 like this is arranged in a recessed portion of the insulating base 23 defined in front of the conductive base 21. The ground plate 146 is isolated from the vehicle roof at a predetermined distance. Further, the ground plate 146 is isolated from grounds of other antennas other than the SDARS antenna. The reason for this is described later.

The LTE antenna 15 is formed (erected) on the substrate 18. The GNSS antenna 16 is a planar antenna, and is mounted to a surface (an upper surface) of the substrate 18. A GNSS amplifier circuit, an LTE antenna matching circuit, and a diplexer circuit which integrates outputs from the two antennas 15 and 16 into one (not shown in the drawings), are mounted on a back surface (a lower surface) of the substrate 18. The GNSS antenna 16 is electrically connected to an input port of the GNSS amplifier circuit. Further, the LTE antenna 15 is electrically connected to an input port of the LTE antenna matching circuit. The electrical connections are performed by soldering or the like. The telephone antenna 17 described above is formed on a surface (an upper surface) of the substrate 19. A matching circuit for the telephone antenna 17, an AM/FM amplifier circuit, and the like (not shown in the drawings) are mounted on a back surface (a lower surface) of the substrate 19.

The base unit 20 includes the conductive base 21 which is made of metal and has the same potential as the vehicle roof after being mounted to the vehicle roof, the O-ring 22 which is a soft insulator, and the insulating base 23 which is made of a resin and has an outer periphery corresponding to a shape of the lower surface portion of the antenna case 10. The insulating base 23 is made of a resin having strength to hold the conductive base 21, the antenna case 10, the inner case 11, and the SDARS antenna 14. The conductive base 21 is a member formed by die-casting to have a predetermined strength, and has the same potential as the vehicle roof at a time of mounting to serve as the ground (earth).

Recessed portions 211 and 212, and a wall portion 213 configured to shield those recessed portions 211 and 212 are formed on a surface side (an upper surface side) of the conductive base 21. Electronic components such as the AM/FM amplifier circuit mounted on the back surface of the substrate 19 are accommodated in the recessed portion 211. Electronic components such as the GNSS amplifier circuit mounted on the back surface of the substrate 18 are accommodated in the recessed portion 212. The wall portion 213 shields those accommodating spaces. That is, each of the substrates 18 and 19 are positioned by the recessed portions 211 and 212, and the wall portion 213, which form respective independent shield regions. That is, the conductive base 21 also serves as a shield member for various electronic components.

Screw holes, through which the substrates 18, 19 and the like are screwed to be fixed, are formed around the recessed portions 211 and 212. It is preferred that intervals between the screw holes be set to be equal to or less than a half of a wavelength of the radio wave to prevent leakage of the radio wave of a desired frequency band. Portions of signal output patterns of the substrates 18 and 19 may be open. Meanwhile, bosses, with which the capture unit 30 described above is screwed and fixed, are formed to protrude downward on a back side (a lower surface side) of the conductive base 21.

The insulating base 23 has an outer peripheral portion, a shape of which corresponding to a shape of the opening surface portion of the antenna case 10. The insulating base 23 includes a guide groove configured to be fitted with the O-ring 22, and an engagement mechanism configured to be engaged with the inner case 11 in a slightly inner side of the outer peripheral portion. A component mount surface 231 in a flat shape is defined in an inner side of the guide groove or the engagement mechanism. A hole portion 232 is formed at substantially a central portion of the component mount surface 231, through which the conductive base 21 is mechanically connected to the capture unit 30. Further, a recessed portion 233 is formed in a front of the insulating base 23. The SDARS antenna 14 is accommodated in the recessed portion 233.

The capture unit 30 includes a bolt 31, a vehicle fixing claw member 32, a pre-lock holder 33, the sealing member 34, and metal springs 35. The pre-lock holder 33 is configured to temporarily fix the antenna device 1 to the vehicle roof. The pre-lock holder 33 includes a locking claw. The locking claw is fitted around a mount hole on the vehicle roof side when an antenna mount boss portion is inserted to fit in a mount hole on the vehicle roof side. Consequently, the antenna device 1 can be temporarily fixed before the bolt 31 is tightened so that workability of mounting the antenna to the vehicle roof can be improved. After the antenna device 1 is temporarily fixed, by tightening the bolt 31, a claw of the vehicle fixing claw member 32 is opened. Thereafter, a tip of the vehicle fixing claw member 32 scratches a painted surface of the vehicle roof so that the vehicle roof is connected to the conductive base 21 to have electrically substantially the same potential, and is mechanically fixed. Further, by tightening of the bolt 31, the sealing member 34 having elasticity, which is fixed to a back surface (a lower surface) of the insulating base 23 with an adhesive or the like, is compressed. As a result, dust can be prevented from entering into an interior through the vehicle roof, and waterproof can be achieved. Further, rust prevention on the conductive base 21 and the metal springs 35, and waterproof property can be secured.

A curvature of the vehicle roof, to which the antenna device 1 is mounted, may be different depending on the type of an automobile. The metal springs 35 are members having a portion, which has a sliding property, in a convex shape to be brought into contact with the vehicle roof, and are deformed to follow a shape (curvature) of the vehicle roof. The effect thereof is described later.

<Structure of AM/FM Antenna>

Figure 3:
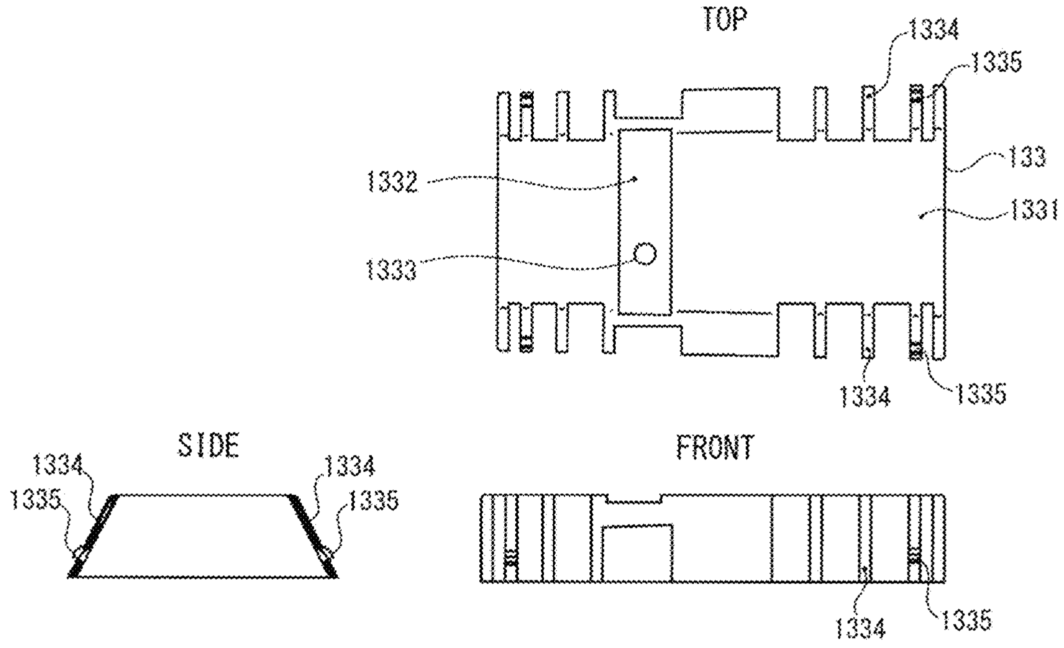
FIG. 3 shows top, side and front views of a structure of a holder.

Next, the structure of the AM/FM antenna 13 is described in detail. The AM/FM antenna 13 has a holder 133 having a three-dimensional shape of a trapezoid in cross section. FIG. 3 shows a top view, a front view, and a side view of the holder 133. The holder 133 is long in the front-back directions and is short in the right-left directions, is made of a synthetic resin having a wave permeability, and has an upper bottom surface 1331 being substantially a flat surface. Further, a groove portion 1332 having a flat bottom surface with a predetermined width is formed slightly on a front side with respect to a central portion in a longitudinal direction of the upper bottom surface 1331. The groove portion 1332 has a screw hole 1333 at a predetermined portion thereof. The screw hole 1333 is used to screw the capacitance loading elements 131 and 132, and the helical element 134 to an inner wall boss of the inner case 11 together. A plurality of ribs 1334 having different widths are formed on both side portions of the holder 133. At least one of the ribs 1334 includes a locking claw 1335. The rib 1334 and the locking claw 1335 serves not only to regulate angles and positions of the capacitance loading elements 131 and 132 but also to improve strength of the holder.

Figure 4:
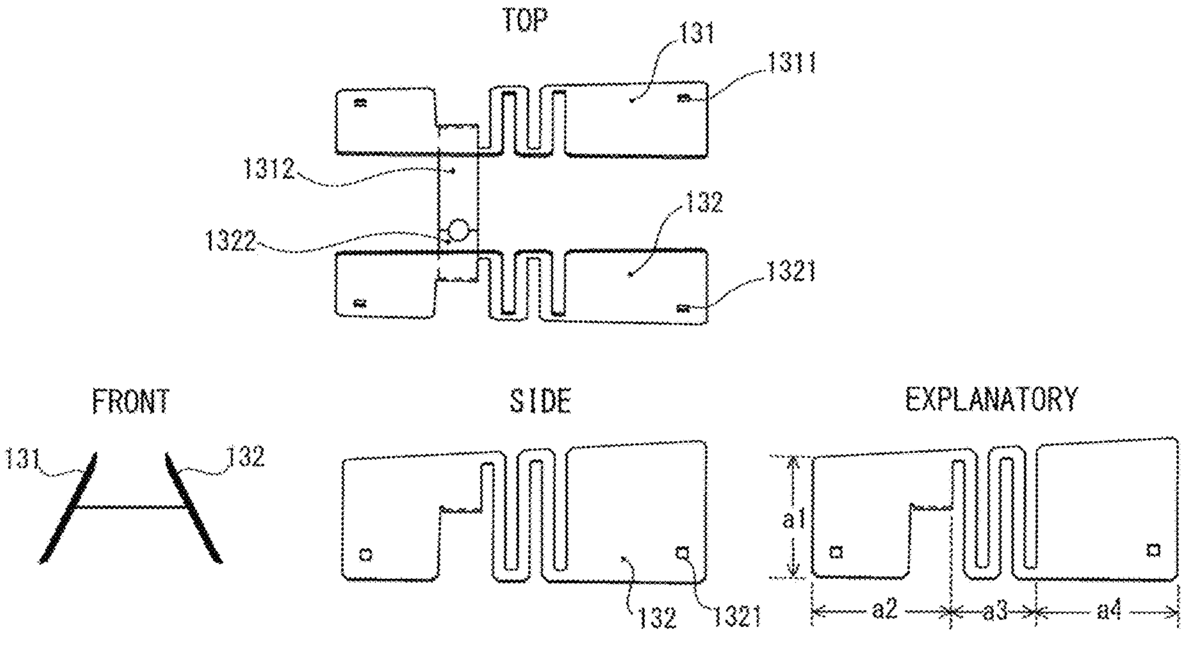
FIG. 4 shows top, front, side and explanatory views of a structure of capacitance loading elements.

FIG. 4 shows explanatory views for illustrating shape and arrangement examples of the capacitance loading elements 131 and 132, in which a top view, a front view, and a side view are illustrated. Further, an explanatory view of a size of those capacitance loading elements 131 and 132 is also illustrated in FIG. 4. As illustrated in those drawings, the capacitance loading elements 131 and 132 are elements formed of composite elements in which front surface portions at a front are connected to rear surface portions at a rear at a time of mounting, respectively, by meandering portions in a band shape. The "meandering portion" refers to a surface formed of a thin conductive element which has at least one or more meandering portions. Both the capacitance loading elements 131 and 132 are elements having substantially symmetrical shapes, and one element faces another element at a predetermined interval and at a predetermined angle across a plane perpendicular to the vehicle roof. The interval and the angle are determined in accordance with a shape of the inner space of the inner case 11. Further, the rear surface portion has the tall structure in height.

Further, the capacitance loading elements 131 and 132 include coupling portions 1312 and 1322 at portions lower than portions (hereinafter, referred to as "upper end portions") to be uppermost ends, respectively, at the time of mounting. Through those coupling portions 1312 and 1322, the capacitance loading element 131 and 132 are electrically connected to each other. Slits are formed in portions of the respective capacitance loading elements 131 and 132, and remaining portions are bent to form each of the coupling portions 1312 and 1322. Lengths of the coupling portions 1312 and 1322 are different from each other so that mounting directions of one capacitance loading elements 131 and another capacitance loading element 132 having substantially symmetrical shapes can be defined clearly, but is not always necessary as that way.

The front surface portions and the rear surface portions of those capacitance loading elements 131 and 132 have fixing holes 1311 and 1321. Those fixing holes 1311 and 1321 are used to receive the locking claws 1335 of the holder 133. Thus, the capacitance loading elements 131 and 132 can be locked to the holder 133 without using an adhesive or the like. As a result, it is not only possible to simplify assembling processes, but also to suppress variations in electrical characteristics owing to use of an adhesive or the like.

Further, instead of fixing by locking claws, after temporal fixing is performed with use of the locking claws, it is possible to intend to fix the capacitance loading elements 131 and 132 to the holder by heating with heat or the like and welding.

In the example of this embodiment, a height a1 of the front surface portion illustrated in FIG. 4 is about 26 mm, a length a2 in a horizontal direction is about 23 mm, a length a3 of the meandering portion in the horizontal direction is about 14 mm, and a length a4 of the rear surface portion in the horizontal direction is 23 mm. The meandering portion has a path length in the height direction.

A wavelength λ1 of the SDARS is about 120 mm, and, the height a1, and the lengths a2 and a4 are equal to or less than about ¼ with respect to the wavelength λ1 of the SDARS, and the path length of the meandering portion is about ½. Therefore, impedance when the meandering portion (start end) is viewed from the front surface portion becomes higher in frequency of the SDARS, and is electrically isolated. That is, the capacitance loading elements 131 and 132 serves, for example, in a frequency band used in the SDARS, as an impedance converter. This is also applied to the impedance when the meandering portion (rear end) is viewed from the rear surface portion.

Therefore, for the SDARS antenna 14, the capacitance loading elements 131 and 132 are conductors having sizes which do not affect its operations (including directivity). Further, for the capacitance loading elements 131 and 132, the impedance from the rear end portions toward the meandering portions and the impedance from the front end portions to the meandering portions become higher in the frequency band of the SDARS. Consequently, the capacitance loading elements 131 and 132 do not suffer an influence due to radio waves of the SDARS. That is, there is no interference with each other. Further, a wavelength λ2 of the GNSS is about 190 mm, and electrical lengths of the capacitance loading elements 131 and 132 each are set to lengths not to be ½ of the GNSS wavelength λ2, at which the capacitance loading elements 131 and 132 do not resonate. Consequently, the capacitance loading elements 131 and 132 do not interfere with the GNSS antenna 16.

In contrast, in the case in which the element having one plane without a meandering portion is used as in Patent Literatures 1 to 3 described above, when required capacitance to ground is attempted to be loaded, a length in the horizontal direction is about 60 mm, and a wavelength is ½ of the wavelength λ1, with the result that influences such as reduction in gain and distortion of directivity are liable to occur at least in the SDARS antenna 14. Further, a height is about twice as height of the height a1 described above, which is also about ½ of the wavelength λ1, with the result that the influences such as reduction in gain and distortion of directivity are liable to occur in the SDARS antenna 14.

According to experiments performed by the present inventors, when plate thicknesses of the capacitance loading elements 131 and 132 were equal to or less than 1 mm to 2 mm (sufficiently small thicknesses with respect to the wavelengths λ1 and λ2), the height a1 was equal to or less than about ¼ of the wavelength λ1 of a radio wave received by the planar antenna 143, and a path length of the meandering portion was about ½±⅛ with respect to the wavelength λ1, interference between the AM/FM antenna 13 and the SDARS antenna 14 was not observed. Further, when the capacitance loading elements 131 and 132 had lengths not to resonate with a radio wave received by the GNSS antenna 16, interference between the AM/FM antenna 13 and the GNSS antenna 16 was not observed. The lengths of the front surface portion and the rear surface portion which are electrically isolated by the meandering portion are desired to be equal to or less than approximately ¼ or less of the wavelength λ1.

As illustrated in FIG. 4, the capacitance loading elements 131 and 132 having the structure including the upper end portions being open exhibit an excellent effect also in a relationship with the helical element 134. That is, with the upper end portions of the capacitance loading elements 131 and 132 being open, projected areas of the helical element 134 and the upper end portions are decreased as compared to the case in which capacitance loading is performed by one plane. Consequently, in the capacitance loading elements 131 and 132, eddy currents, which act to cancel a high frequency current generated in the helical element 134, are decreased. As a result, efficiency degradation of the AM/FM antenna 13 is decreased. Further, with the effect like this, a degree of freedom for an arrangement position of the helical element 134 with respect to the upper end portions is increased. For example, the helical element 134 is not necessarily to be placed at a center of the upper end portions of the capacitance loading elements 131 and 132.

The capacitance loading elements 131 and 132 are not required to be subjected to a folding process or a drawing process so that, in the structure according to this embodiment, in which the upper end portions of the capacitance loading elements 131 and 132 are open, processing steps are simplified, with the result that the structure contributes to reduction in manufacturing cost. Further, in the structure like this, an effect can be also obtained, in which floating capacity generated between adjacent conductors, that is, between the capacitance loading elements 131 and 132, and the telephone antenna 17 in this example, is decreased compared to the case in which the capacitance loading plate in one plane is used. Floating capacity is a reactive capacitance component which a designer does not intend to obtain, and is caused by the physical structure. As described above, the gain is decreased when the floating capacity is increased.

Figure 7:
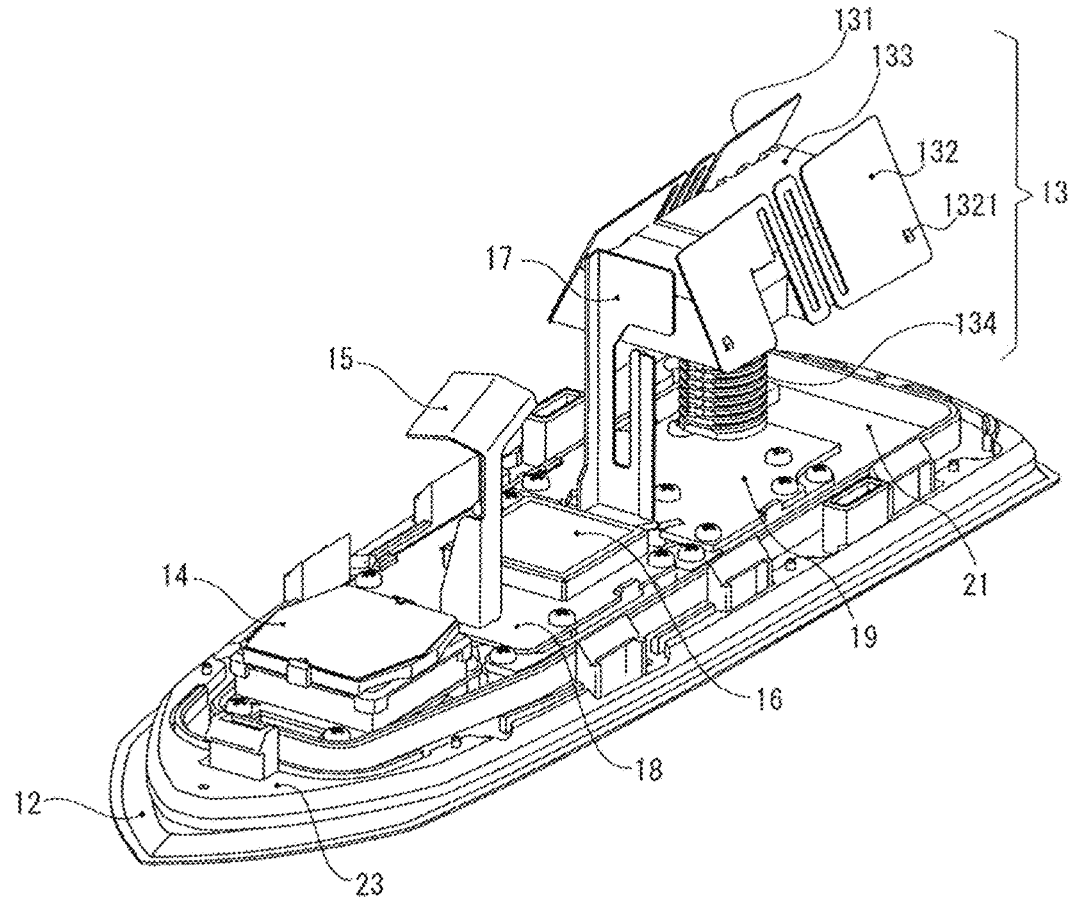
FIG. 7 shows an external perspective view for illustrating a state of an antenna unit to be accommodated in an accommodating space.
Figure 8:
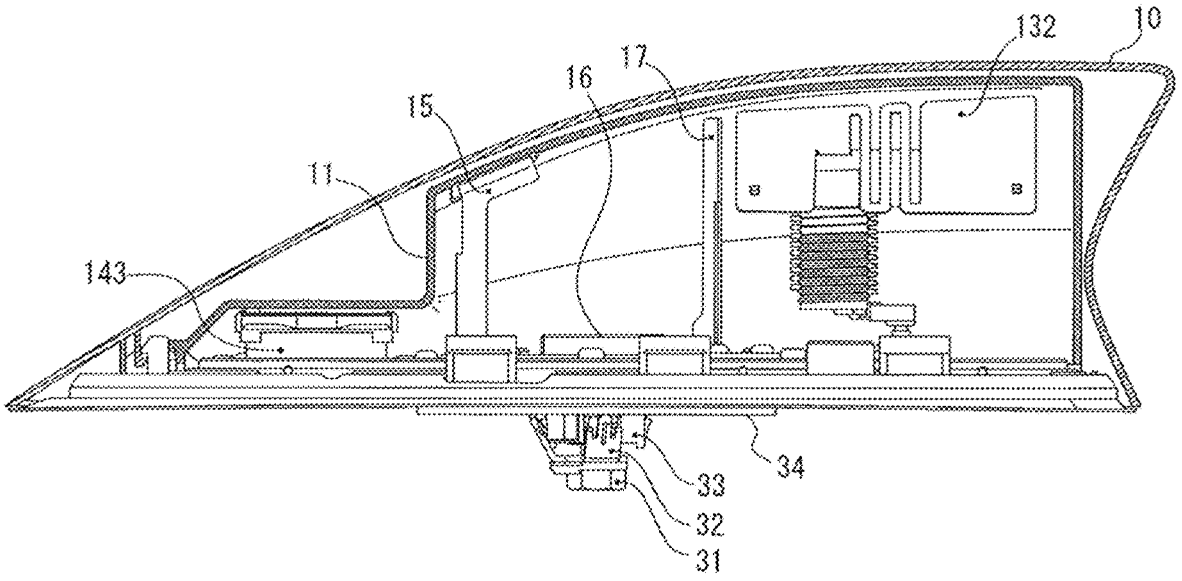
FIG. 8 shows a perspective view for illustrating a structural example of the antenna device including the antenna unit in the accommodating space.

The telephone antenna 17 is arranged substantially at a middle between side edges of the respective front surface portions of the facing capacitance loading elements 131 and 132. With this structure, the floating capacity can also be decreased, with the result that a distance between the telephone antenna 17, and the capacitance loading elements 131 and 132 facing each other can be shortened as illustrated in FIG. 7 and FIG. 8. In order to further decrease the floating capacity with respect to the telephone antenna 17, one or more holes or slits may be further formed in the capacitance loading elements 131 and 132. With such a structure, the floating capacity can be further decreased mainly with respect to the ground on a lower surface sides of the capacitance loading elements 131 and 132. Therefore, sufficient performance can be obtained even when the lower surface side is formed by the conductive base.

Figure 5:
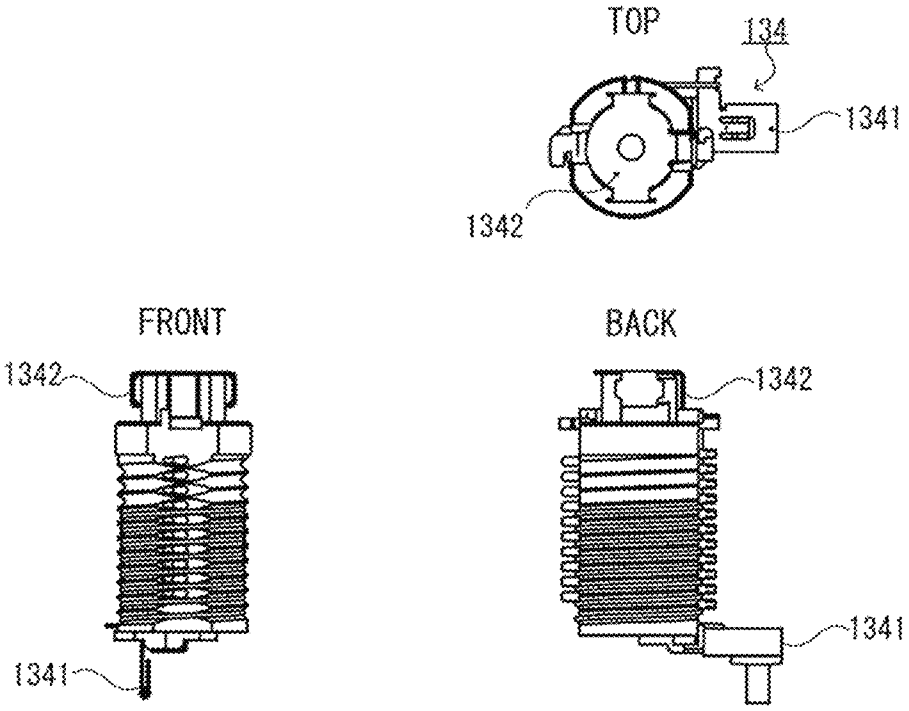
FIG. 5 shows top, front and side views of a structure of a helical element.

Next, the helical element 134 is explained. FIG. 5 shows a top view, front view, and a side view of the helical element 134. The helical element 134 is formed of the cylindrical bobbin, which is made of a synthetic resin having a radio wave permeability, wound by the conductive wire. On a surface of the bobbin, a groove is formed having a predetermined diameter and a pitch to have a desired shape of the helical antenna. By winding of the linear conductor with required turns around the bobbin, the helical element 134 can act as the helical antenna. At a lower portion of the bobbin, the lower portion terminal 1341 is formed which is electrically connected to one end of the conductive wire. This lower terminal 1341 is elastically held by the above-described M-shaped connecting piece 191, and is conductive to an input terminal of the AM/FM amplifier circuit mounted on the back surface of the substrate 19. An upper portion terminal 1342 is electrically connected to another end of the conductor. A metal screw is inserted upward from inside the bobbin, a leg of the metal screw is inserted through a screw hole 1333 of the holder 133 and a circular hole defined by the coupling portions 1312 and 1322 of the capacitance loading elements 131 and 132. Thus, by the metal screw, the holder 133 and the capacitance loading elements 131 and 132 are fastened to the inner wall bosses of the inner case 11 together. Consequently, the upper portion terminal 1342 is electrically connected to the capacitance loading elements 131 and 132. The metal screw may be a screw with a spring washer to increase mechanical holding ability.

Further, the upper portion terminal 1342 has the structure which can be turned over by 180 degrees to be mounted to the bobbin, and has the structure in which the number of turns of the helical element 134 can be adjusted for each half-turn while sharing components. As a result, a received frequency can be adjusted, and a degree of freedom in design can be improved.

Figure 6:
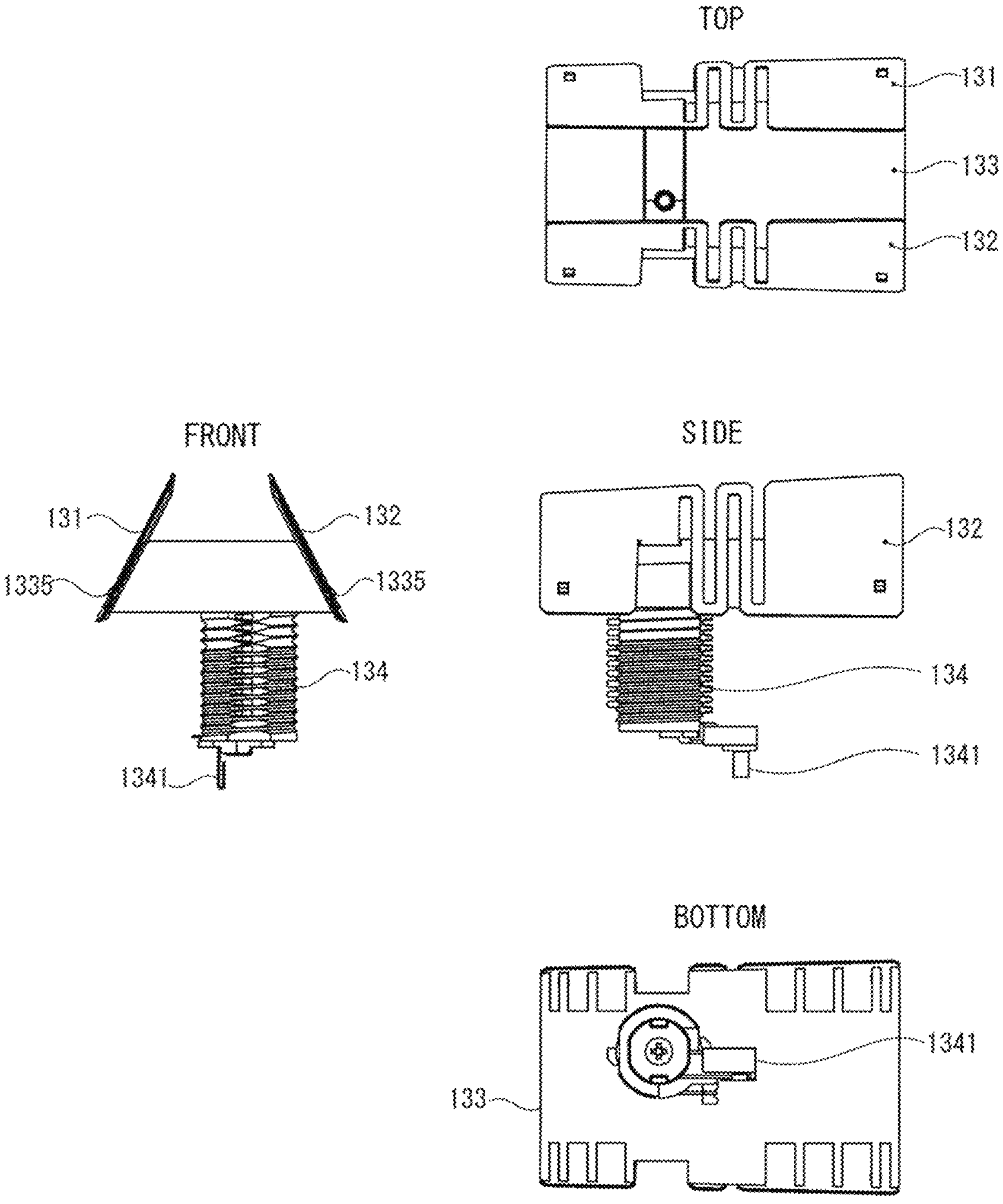
FIG. 6 shows top, front, side and bottom views of a structure of an AM/FM antenna.

In FIG. 6, illustrated is a state in which the capacitance loading elements 131 and 132 are fixed to the holder 133, and further the helical element 134 is mounted to the holder 133. In FIG. 6, a top view, a front view, a side view, and a bottom view is illustrated. In comparison to the case in which the capacitance loading plate having one plane, the upper end portions of which being closed, the degree of freedom in arrangement position of the helical element 134 is increased as described above. In this embodiment, the lower portion terminal 1341 is positioned substantially at a middle between the capacitance loading elements 131 and 132, and the helical element 134 itself is slightly eccentric to the capacitance loading element 132 side. By the helical element 134 being eccentric like this, a capacitance loading element adjacent to the helical element 134 serves to be the capacitance loading element 132. For that reason, electrical interference can be caused to occur only with respect to the capacitance loading element 132 so that interference can be reduced and performance degradation can be suppressed as compared to a case in which electrical interference occurs with respect to both the capacitance loading elements 131 and 132. The helical element 134 may be slightly eccentric to the capacitance loading element 131 side.

Further, a state of the antenna unit to be accommodated in the accommodating space of the inner case 11 is illustrated in FIG. 7. FIG. 7 is an external perspective view for illustrating a state of the antenna device 1 assembled according to the arrangement illustrated in FIG. 2, in which only the antenna case 10, the inner case 11, and the O-ring 22 are removed. Further, FIG. 8 is an explanatory view for illustrating a state in which the antenna case 10, the inner case 11, and the O-ring 22 are also assembled when viewed through the accommodating space.

As illustrated in those drawings, the antenna device 1 of this embodiment includes the capacitance loading elements 131 and 132, the edges of which being apart from each other, and a surface to be parallel to the vehicle roof is open. Therefore, capacitance to ground is added to the helical element 134 by the capacitance loading elements 131 and 132, but floating capacity is decreased. As a result, the gain in the AM broadcast and the FM broadcast is improved. Further, the edges of the facing capacitance loading elements 131 and 132 are discontinuous from each other. As a result, interference with radio waves received by the antennas for other media, can be suppressed.

That is, the antenna device 1 is in low height, a size of which being about 230 mm in the longitudinal direction, about 75 mm in width, and about 70 mm in height, and having the small accommodating space in low height. However, the SDARS antennas 14, the LTE antenna 15, the GNSS antenna 16, the telephone antenna 17, and the AM/FM antenna 13 can be arranged in the antenna device 1 from a front in this order without being interfered with each other.

As illustrated in FIG. 7 and FIG. 8, the AM/FM antenna 13 is arranged to be close to the telephone antenna 17. Therefore, the AM/FM antenna 13 configured to receive a frequency lower than a frequency received by the telephone antenna 17 is more susceptible to an influence of telephone antenna 17. Then, in this embodiment, in the matching circuit mounted on the back surface of the substrate 19, a capacitor of about, preferably, 20 pF is connected in series to a feeding point of the telephone antenna 17 so as to match impedance of the received signals in respective frequencies. For example, 20 pF corresponds to impedance of about 80 kΩ at 1 MHz in the AM band, and of about 80Ω at 100 MHz in the FM band.

In contrast, in the frequency band received by the telephone antenna 17, impedance corresponds to 10Ω or less, for example, at 800 MHz or more, to be significantly lowered. Further, in order to match the impedance with that of the telephone antenna 17 by the matching circuit, a loss becomes smaller in a received band of the telephone antenna 17. In consideration of a received bandwidth of the telephone antenna 17, about 2 pF to 20 pF is desired. With this, an effect is obtained both the gain of the telephone antenna 17 and the gain of the AM/FM antenna 13 can be ensured. Alternatively, the same effect can be obtained by formation of a Band Elimination Filter (BEF) of a parallel resonance circuit including an inductor and a capacitor to increase impedance around the AM band or the FM band.

Further, a filter for allowing a frequency of the telephone antenna 17 to have high impedance is connected in series between the M-shaped connecting piece 191, which forms the power supply for the AM/FM antenna 13, and the AM/FM amplifier to further prevent mutual interfere. The filter is a filter configured in which a chip capacitor is not arranged between a signal path and the ground, and the received signals in the AM band is not divided by the capacitor and not attenuated. The filter is configured to induce parallel resonance between the inductor and the capacitor, and to reflect or attenuate a desired frequency band of the telephone antenna 17 with an open stub.

<Mounting Structure for SDARS Antenna>

In this embodiment, the SDARS amplifier substrate 144 is mounted on a back surface side of the substrate of the planar antenna 143 for the SDARS. Further, the planar antenna 143 and the SDARS amplifier substrate 144 are sandwiched between the parasitic element holder 142 accommodating the parasitic element 141, and the shield cover 145 made of metal. On a lower surface of the parasitic element holder 142, ribs are provided at least at two or more positions for positioning the planar antenna 143 for the SDARS. Further, a thickness of the parasitic element holder 142 is set to a thickness to keep a space between the parasitic element 141 and planar antenna 143 for the SDARS constant. At least one or more slits for positioning are formed, and the positioning is performed by fitting of the slits in the ribs for positioning of the parasitic element holder 142. This structure may further be formed such that a protruding portion is provided on the parasitic element 141 and forms a shape in a recessed portion in the parasitic element holder 142. Then, those members are tightened together to be fixed with screws which are passed through holes formed in the SDARS amplifier substrate 144 and holes formed in the ground plate 146. The ground plate 146 is arranged at a front of the insulating base 23, and is fitted to be positioned in the recessed portion 233 defined inside with respect to the ribs of the insulating base 23. A thickness of a portion, in which the recessed portion 233 is formed, of the insulating base 233 is thinner than a thickness of a portion in which the recessed portion 233 is not formed. However, the recessed portion 233 is formed, a portion of which having a shape to be along a shape of the ground plate 146 on the inner side with respect to the ribs of the insulating base 23. Therefore, the strength of the insulating base 23 is sufficiently ensured.

Further, the ground plate 146 is not connected to the conductive base 21 so as to be electrically isolated from the conductive base 21. This structure prevents an influence on electrical characteristics of the LTE antenna 15 and/or the telephone antenna 17, and prevents an influence on directivity of the SDARS antenna 14.

That is, the conductive base 21 also functions as the ground for the LTE antenna 15, the GNSS antenna 16, the telephone antenna 17, and the AM/FM antenna 13. However, the conductive base 21 may cause unnecessary resonance (resonance phenomenon) to occur depending on a distance between the vehicle roof and the conductive base 21 and on a size of the conductive base 21. When the conductive base 21 is increased in size, unnecessary resonance is liable to occur. When unnecessary resonance occurs, the gain of the antenna configured to receive a radio wave in a band including the frequency is decreased. Further, depending on a curvature of the vehicle roof configured to mount the antenna device 1, a capacitance component between the conductive base 21 and the vehicle roof is changed, and the gain of each antenna 13 to 17 may be decreased or changed due to the unnecessary resonance.

Here, the unnecessary resonance is briefly explained. Inductance of a portion from the conductive base 21 to the vehicle fixing claw member 32 of the capture unit 30 is assumed to L, and capacitance in a space between the conductive base 21 and the vehicle roof is assumed to C, a frequency "f" at unnecessary resonance is expressed by $1/[2\pi\sqrt{(LC)}]$. Further, an area between the conductive base 21 and the vehicle roof is assumed to S, a distance between the conductive base 21 and the vehicle roof is assumed to "d", and a dielectric constant in the space is assumed to "ε", the capacitance C is expressed by $\varepsilon \cdot S/d$. Further, when a conductor loss is assumed to R, a Q value representing sharpness at the unnecessary resonance is calculated by $[\sqrt{(L/C)}]/R=1/(\omega CR)$. Here, "ω" is an angular frequency at the unnecessary resonance, and is expressed by "ω"=2πf. When the Q value of the unnecessary resonance is decreased, an effect on the gain becomes little. When the conductive base 21 becomes larger to increase the area S, the capacitance C is increased, and the frequency "f" at the unnecessary resonance is lowered. As a result, the frequency "f" at the unnecessary resonance becomes a frequency included in a band (within a band in specifications) of a frequency used for transmission or reception, and the gain of an antenna configured to receive a radio wave in a band including that frequency may be decreased. Further, the vehicle roof has various types, and each curvature may be different from each other. In a case that the metal springs 35 are not present, when the curvature of the vehicle roof is large, the capacitance C is decreased. Then, the frequency "f" at the unnecessary resonance becomes high, the Q value become large, and the gain of each antenna 13 to 17 becomes lower. Meanwhile, when the curvature of the vehicle roof is small, the capacitance C is increased, the frequency "f" at the unnecessary resonance is lowered, and the Q value is decreased. Thus, the capacitance C varies largely depending on the curvature of the vehicle roof, and the frequency "f" at the unnecessary resonance also varies largely.

Then, in this embodiment, portions in a convex shape of the metal springs 35 are brought into contact with the vehicle roof to firstly suppress an amount of variation of the frequency "f" at the unnecessary resonance, and the antenna device 5 can be mounted to a vehicle roof having various curvatures.

When the metal springs 35 are present, the metal springs 35 have a sliding property, the portions having a convex shape to be brought into contact is deformed to follow a curvature of the vehicle roof Therefore, the amount of variation of the capacitance C is decreased, the amount of variation of the frequency "f" at the unnecessary resonance is also decreased, and the antenna device can be mounted to a vehicle roof having various curvatures.

Further, in this embodiment, the portions in a convex shape of the metal springs 35 are brought into contact with the vehicle roof to secondly increase the capacitance C, and to shift the frequency "f" at the unnecessary resonance to a lower band. Therefore, a frequency at the unnecessary resonance can be shifted outside a band in specifications.

In this embodiment, further, to reduce the conductive base 21 in size not to resonate unnecessarily, the SDARS antenna 14 is not arranged on the conductive base 21 but is arranged on the insulating base 23. Then, the ground plate 146 electrically isolated from the conductive base 21 is used as a ground of the planar antenna 143 for the SDARS. A received band of the planar antenna 143 is a high frequency band as 2.3 GHz band. Therefore, the ground plate 146 as a separate member can have a sufficient ground size to ensure an antenna gain by forming the ground plate 146 slightly larger than the planar antenna 143.

The structure to provide the ground plate 146 separately from the conductive base 21 also has an effect of increasing a degree of freedom in size and in structure of the ground plate 146. The size or the arrangement structure of the conductive base 21 is determined to some extent depending on a required specification of the antenna device 1. However, for example, when an electrical length between the vehicle roof and the conductive base 21 becomes about ¼ of the λ1 of the SDARS, electrical characteristics of the SDARS may be deteriorated. In this embodiment, the ground plate 146 is a separate member from the conductive base 21, the shape and the size of the ground plate 146 can be optionally set such that desired electrical characteristics of the SDARS antenna 14 is obtained. As a result, the directivity can be improved, and the degree of freedom in design can be increased.

Figure 9:
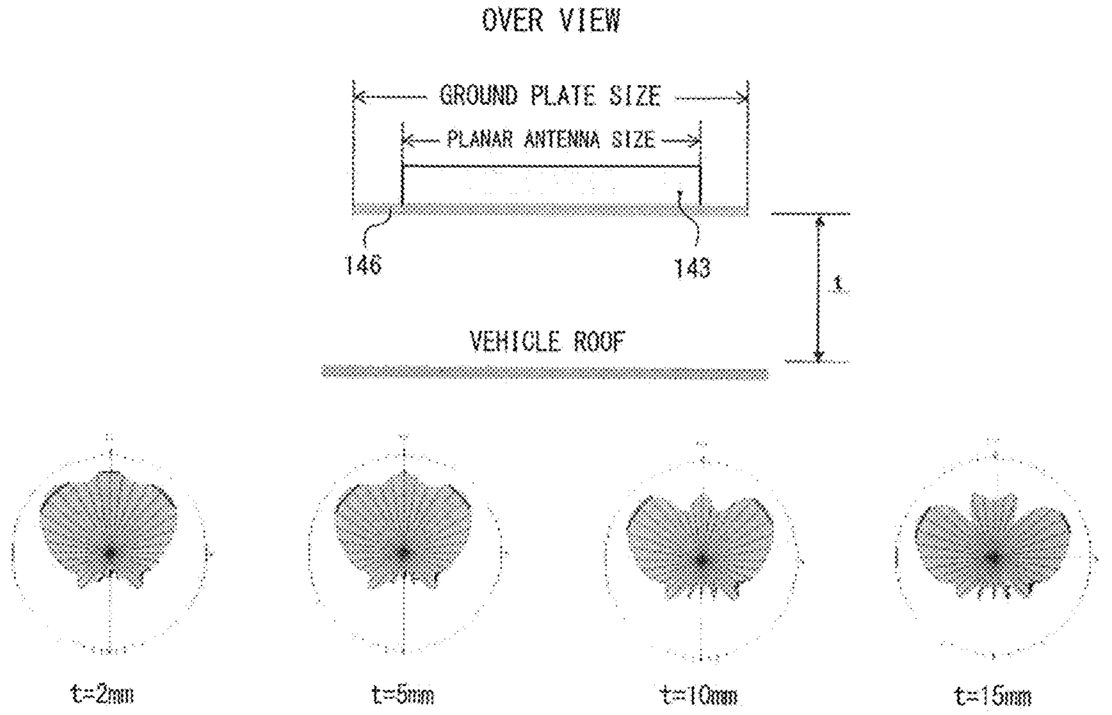
FIG. 9 shows over view for illustrating a relation of positions of a ground plate and a vehicle roof, and diagrams for illustrating examples of variations in electrical characteristics of an SDARS antenna with a distance "t" between the vehicle roof and the ground plate being 2 mm, 5 mm, 10 mm and 15 mm.

FIG. 9 shows an over view and diagrams for illustrating examples of variations in electrical characteristics caused by structural changes in the SDARS antenna 14. As described above, the SDARS antenna 14 is accommodated in the recessed portion 233 of the insulating base 23. The ground plate 146 can be easily positioned in the recessed portion 233 so that workability is improved in assembling, and a depth (thickness) of the recessed portion 233 is a factor for determining a distance between the ground plate 146 and the vehicle roof. As described above, the ground plate 146 has a size slightly larger than the planar antenna 143. Now, as illustrated the over view in FIG. 9, when the distance (depth of the recessed portion 233) between the vehicle roof and the ground plate 146 is assumed to "t", directivity of the planar antenna 143 in the vertical direction has a larger distortion when the distance "t" is increased as illustrated in diagrams with t=2 mm, t=5 mm, t=10 mm and t=15 mm. The distortion of directivity leads to a decrease in gain of the planar antenna 143. Consequently, the distance "t" is 10 mm or less, and desirably from 2 mm to 10 mm. With this structure, electrical characteristics of the SDARS can be achieved, which are practically sufficient while the antenna device has a low height of 70 mm or less.

The SDARS amplifier substrate 144 has a shielding property through soldering or welding of a periphery of the shield cover 145 to the SDARS amplifier substrate 144 to ensure a shielding effect. Since the shield cover 145 is conductive to the ground plate 146, the shield cover 145 has the same potential as the ground plate 146.

Figure 10:
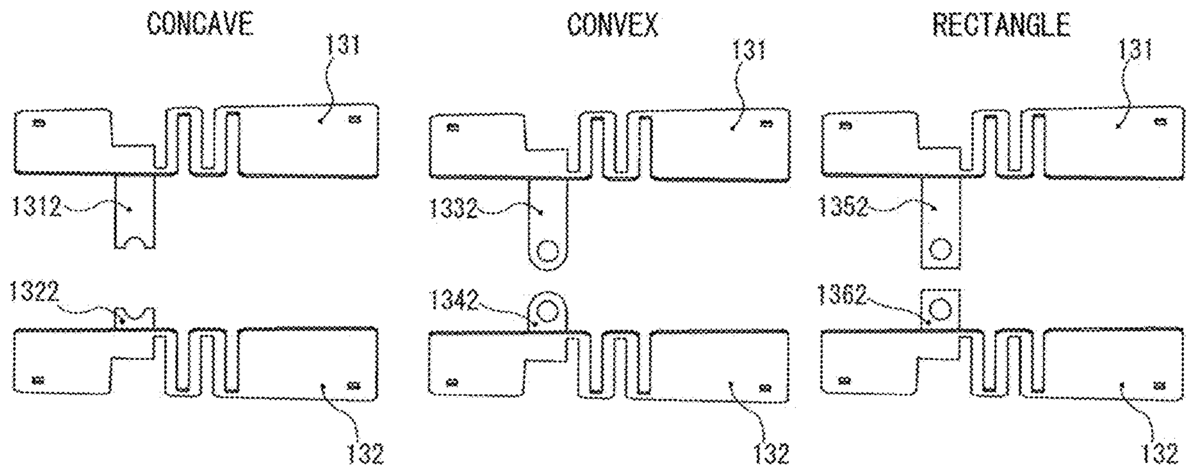
FIG. 10 shows views for exemplifying coupling portions of the capacitance loading elements.

In this embodiment, when the coupling portions 1312 and 1322 of the capacitance loading elements 131 and 132 are coupled, the example is illustrated in which the portions corresponding to the screw hole 1333 are formed as the circular holes. However, such circular holes can easily be formed by cutting out each facing end portions in a semi-circular shape as shown in "concave" in FIG. 10, when respective coupling portions 1312 and 1322 are formed. In other words, a shape formed at respective tip end portions of the coupling portions 1312 and 1322 is formed in a concave shape toward the respective capacitance loading elements 131 and 132. Alternatively, as illustrated in "convex" and "rectangle" in FIG. 10, a shape of the tip end portions of the respective coupling portions 1312 and 1322 may be formed in a convex shape toward the respective facing end portion or a rectangular shape, and circular holes may be formed in vicinities of tip end portions thereof. In both cases, those circular holes serve as roles for positioning. As a result, an effect is obtained in which workability at a time of fixing to the holder 133 is facilitated.

Further, a meandering shape is formed in the upper-lower directions, but the same effect can be obtained when the meandering shape is formed in the front-back directions.

Second Embodiment

Figure 11:
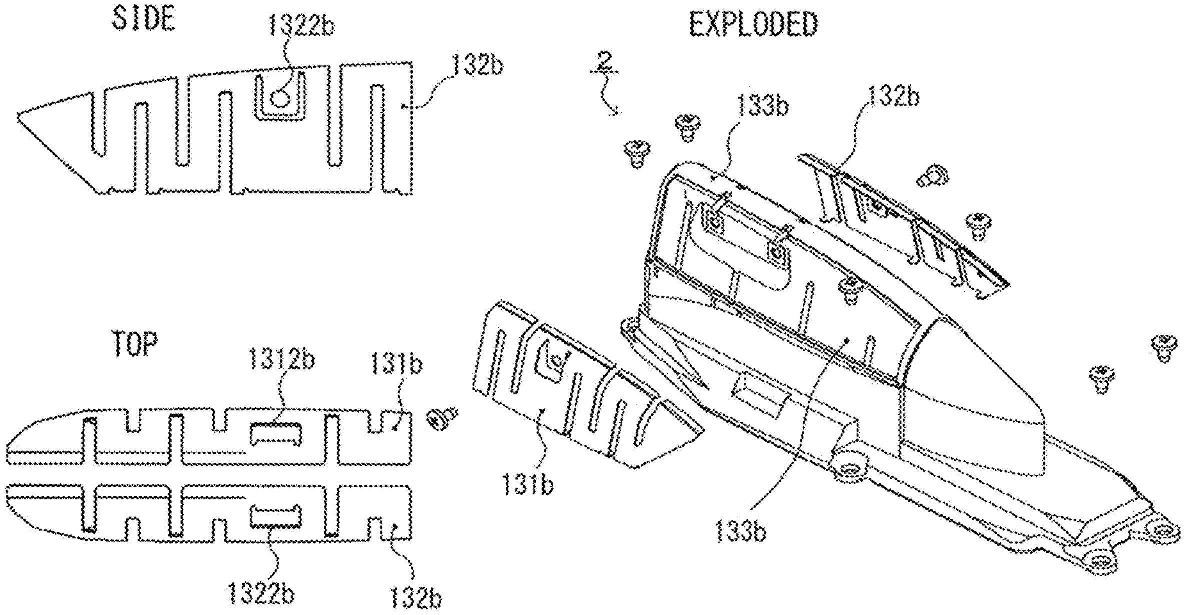
FIG. 11 shows side, top, and partially exploded (for assembly illustration) views of a capacitance loading element of an antenna device according to a second embodiment of the present disclosure.

Next, a second embodiment of the present disclosure is explained. An antenna device of the second embodiment has the structure similar to the basic components and arrangements of the antenna device 1 of the first embodiment such as an antenna case, an inner case, a base unit, a plurality of antennas, substrates, and a capture unit. However, shapes of the capacitance loading elements forming an AM/FM antenna and the structure of a holder in the second embodiment are different from those of the antenna device 1 of the first embodiment. FIG. 11 shows a side view, a top view, and an explanatory view for illustrating assembling without a portion of the inner case, for convenience, of a capacitance loading element included in the antenna device according to the second embodiment. An antenna device 2 of this embodiment is the same as the capacitance loading elements 131 and 132 of the first embodiment in that a pair of capacitance loading elements 131*b* and 132*b* are provided and portions thereof are formed as coupling portions 1312*b* and 1322*b*, but is different in meandering shapes and the mounting structure to a holder 133*b*. The coupling portions 1312*b* and 1322*b* have tip ends extending downward, and are conductive to each other with metal screws through intermediation of a conductive relay member.

In the antenna device 2 of the second embodiment, upper edges and lower edges of the capacitance loading elements 131*b* and 132*b* are also separated from each other, and a surface to be parallel to the vehicle roof is open. Therefore, capacitance to ground is added to a helical element by the capacitance loading element 131*b* and 132*b*, but floating capacity is decreased. The coupling portions 1312*b* and 1322*b* extend downward so that generation of the floating capacity can be suppressed by the coupling portions 1312*b* and 1322*b*. Therefore, a gain in the AM broadcast and the FM broadcast is improved. Further, the edges of the capacitance loading elements facing each other are discontinuous. As a result, interference with radio waves received by antennas for other media can be suppressed.

Third Embodiment

Figure 12:
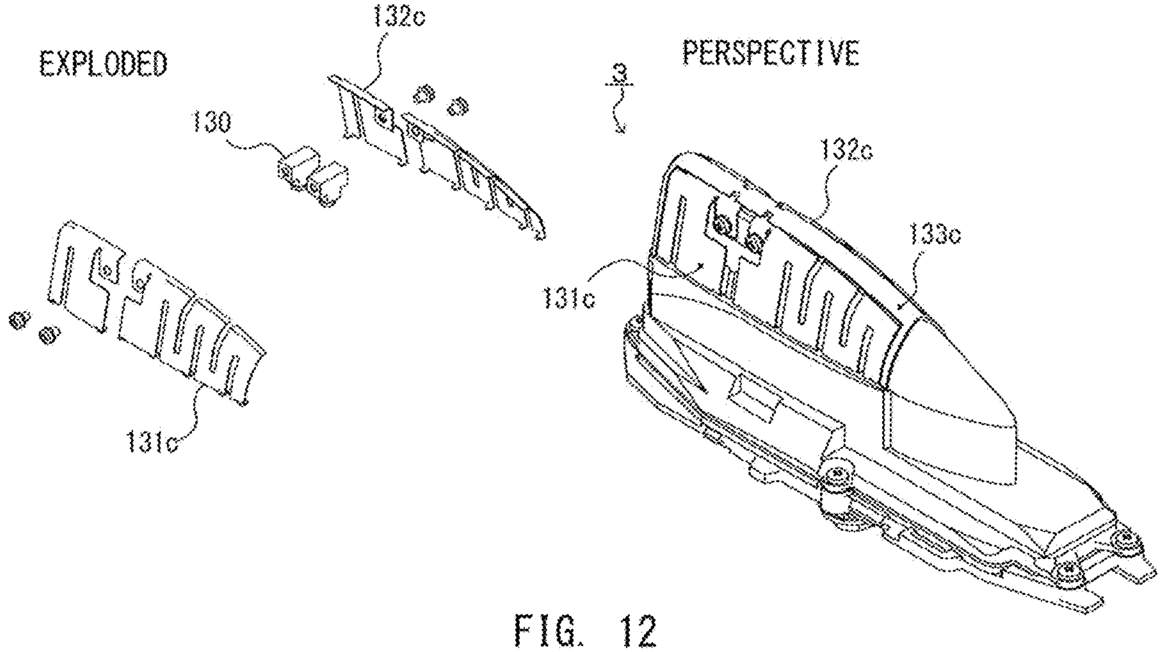
FIG. 12 shows exploded view of a capacitance loading element of an antenna device and external perspective (with a part of an antenna case being abbreviated) view of the antenna device according to a third embodiment of the present disclosure.

Next, a third embodiment of the present disclosure is explained. An antenna device of the third embodiment has the structure similar to the basic components and arrangements of the antenna device 1 of the first embodiment such as an antenna case, an inner case, a base unit, a plurality of antennas, substrates, and a capture unit. However, in the antenna device of the third embodiment, shapes of the capacitance loading elements forming an AM/FM antenna and the structure of a holder are different from those of the antenna device 1 of the first embodiment. FIG. 12 shows an exploded view for illustrating assembling of the capacitance loading elements included in an antenna device according to the third embodiment, and an external perspective view of the antenna device after being assembled. An antenna device 3 of this embodiment is the same as the capacitance loading elements 131*b* and 132*b* of the second embodiment in that a pair of capacitance loading elements 131*c* and 132*c* are provided, and portions thereof are formed as coupling portions, but is different in meandering shapes and two coupling portions formed therein.

In the antenna device 3 of the third embodiment, upper edges and lower edges of the capacitance loading elements 131*c* and 132*c* are also separated from each other, and a surface to be parallel to the vehicle roof is open. Therefore, capacitance to ground is added to a helical element by the capacitance loading element 131*c* and 132*c*, but floating capacity is decreased. Therefore, the gain in the AM broadcast and the FM broadcast is improved. Further, the edges of the capacitance loading elements facing each other are discontinuous. As a result, interference with radio waves received by antennas for other media can be suppressed.

Fourth Embodiment

Figure 13:
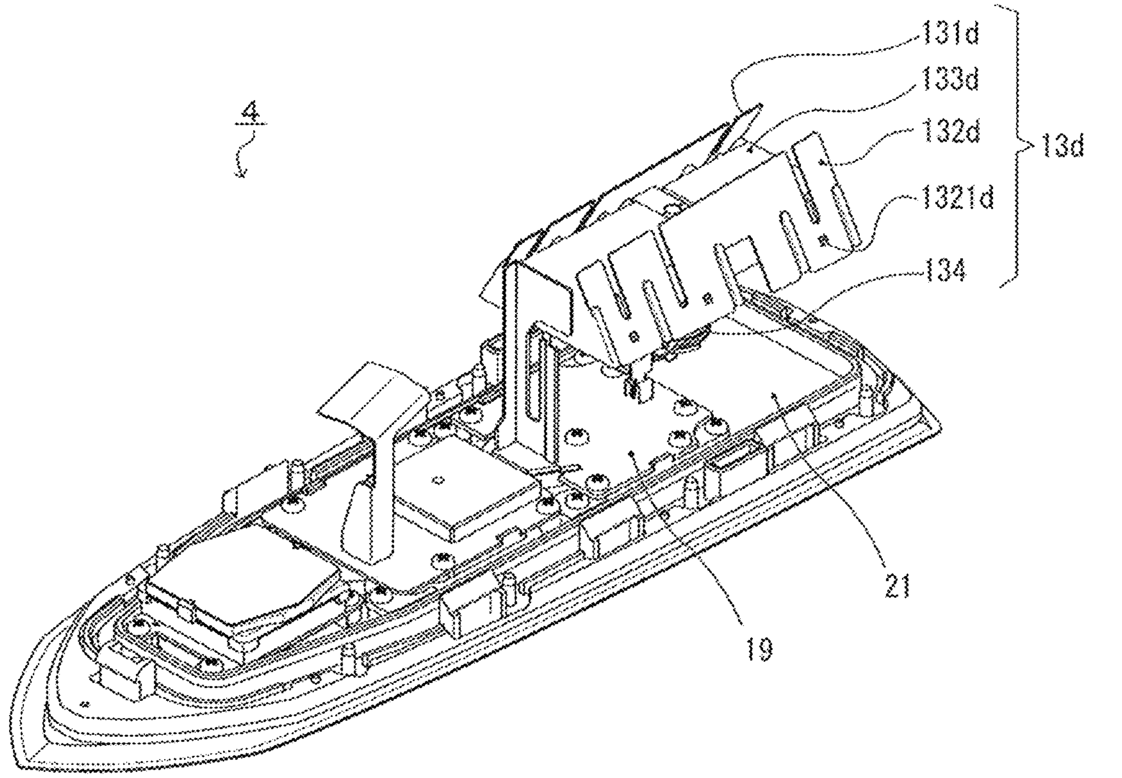
FIG. 13 shows an explanatory view of an arrangement of an antenna unit of an antenna device according to a fourth embodiment of the present disclosure.
Figure 14:
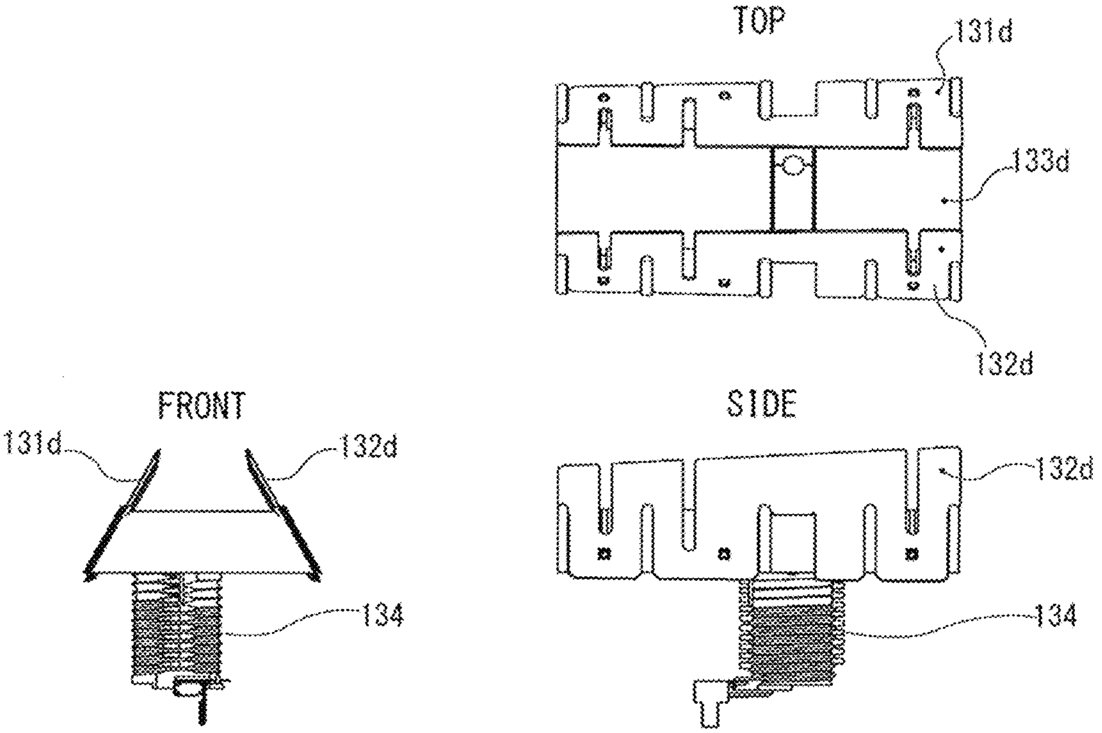
FIG. 14 shows top, front and side views of the structure of an AM/FM antenna in the fourth embodiment.

Next, a fourth embodiment of the present disclosure is described. An antenna device of the fourth embodiment has the structure similar to the basic components and arrangements of the antenna device 1 of the first embodiment such as an antenna case, an inner case, a base unit, a plurality of antennas, substrates, and a capture unit. However, in the antenna device of the fourth embodiment, a structure of an AM/FM antenna is different from that of the antenna device 1 of the first embodiment. FIG. 13 is an explanatory view for illustrating an arrangement of an antenna unit of an antenna device 4 according to the fourth embodiment. Further, FIG. 14 shows a top view, a front view, and a side view for illustrating the structure of an AM/FM antenna in the fourth embodiment.

The antenna device 4 of the fourth embodiment is similar to the capacitance loading elements 131 and 132 of the first embodiment in that a pair of capacitance loading elements 131*d* and 132*d* are provided, portions thereof are formed as coupling portions, and the capacitance loading elements 131*d* and 132*d* are fixed to a holder 133*d* through fixing holes 1321*d*, but is different in meandering shapes. The capacitance loading elements 131*d* and 132*d* of the fourth embodiment have a widened portion as a coupling portion which is a remaining portion of folded portions, and have a first meandering portion at a front and a second meandering portion at a rear. Further, the helical element 134 includes the similar structure components as the helical element 134 described in the first embodiment, but is different in that the helical element 134 is arranged on the conductive base 21 outside the substrate 19. For that reason, the helical element 134 is eccentric toward the capacitance loading element 131*d*.

In the antenna device 4 of the fourth embodiment, upper edges and lower edges of the capacitance loading elements 131*d* and 132*d* are also separated from each other, and a surface to be parallel to the vehicle roof is open. Therefore, capacitance to ground is added to a helical element 134 by the capacitance loading element 131*d* and 132*d*, but floating capacity is decreased. Therefore, a gain in the AM broadcast and the FM broadcast is improved. Further, the edges of the capacitance loading elements facing each other are discontinuous. As a result, interference with radio waves received by antennas for other media can be suppressed.

The first to the fourth embodiments have been described as above, but embodiments of the present disclosure are not limited to thereto. For example, the pair of capacitance loading elements 131 (131*b* to 131*d*) and 132 (132*b* to 132*d*) (hereinafter, abbreviated as "131 and the like") may be electrically connected to the helical element 134 by a connecting piece having a spring property. Further, the capacitance loading element 131 and the like may be connected to each other by a filter or the like of a conductive pattern formed on LC elements (inductor and capacitor) or a substrate such that a resonance frequency between the capacitance loading element 131 and the like, and the helical element 134 is not around a desired frequency.

Further, the shape of the capacitance loading element 131 and the like can take any shape such as a shape in at least one folded portion, a zigzag shape or a winding shape, and a fractal shape, in addition to a meandering shape as long as the shape of the capacitance loading element 131 and the like serve as electrical delay units. Further, in each embodiment, although the edges such as the upper edges and the lower edges of the capacitance loading element 131 and the like are discontinuous from each other, but front edges and rear edges may be configured to be discontinuous. Still further, the pair of capacitance loading element 131 and the like are not necessarily to have a symmetrical shape.

Yet further, the planar antenna 143 for the SDARS may be arranged replaceably with the GNSS antenna 16 in arrangement. Furthermore, the planar antenna 143 for the SDARS may be configured to be placed on the GNSS antenna 16 vertically. In addition, in a case in which performance requirements to be required are not strict, even when the ground plate 146 is not set and a ground size of the SDARS amplifier substrate 144 or the shield cover 145 is sufficient, improvement in electrical performance can also be expected by recessing in a shape similar to the shape.

Description has been made in which the conductive base 21 is formed to be an integral member by die-casting or the like, and the ground plate 146 is provided separately, but the conductive base 21 also includes the structure in which the conductive base 21 is screwed or welded to the metal thin plate to have electrically the same potential.

Fifth Embodiment

Figure 15:
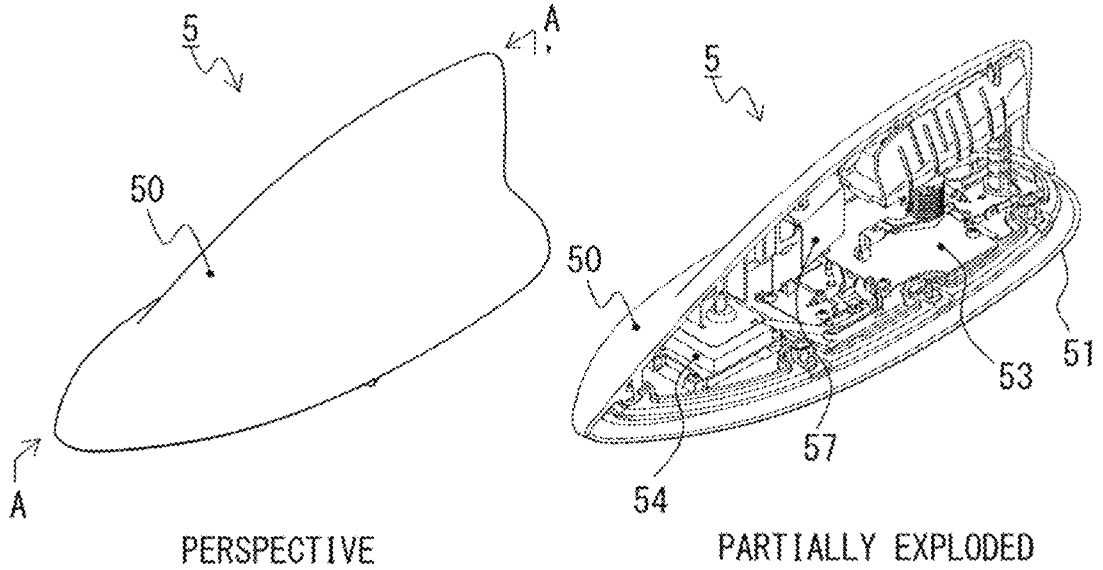
FIG. 15 shows an external perspective view and a partial cut-away view of an antenna device according to a fifth embodiment of the present disclosure.
Figure 16:
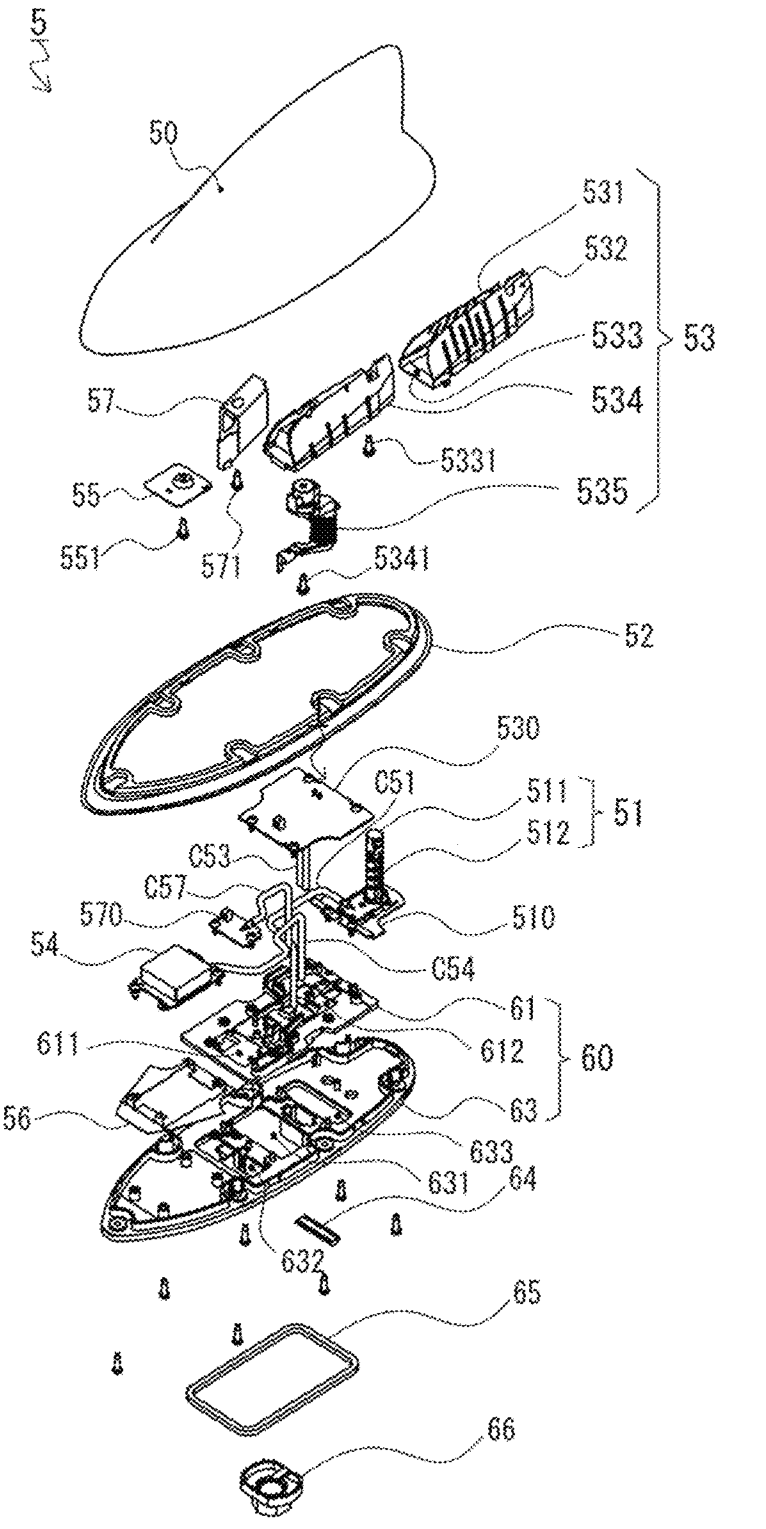
FIG. 16 shows an explanatory view of an arrangement of components forming the antenna device according to the fifth embodiment.

Next, a fifth embodiment of the present disclosure is explained. FIG. 15 shows an external perspective view, a partial cut-away view as viewed from A-A' direction of an antenna device according to the fifth embodiment. FIG. 16 is an explanatory view for illustrating an arrangement of components forming the antenna device according to the fifth embodiment. The antenna device 5 of the fifth embodiment is, similar to the embodiments described above, an antenna device to be mounted to a vehicle roof, and includes a case unit, which has a radio wave permeability and includes an accommodating space formed inside thereof, and an antenna unit which is accommodated in the accommodating space.

The case unit includes an antenna case 50 which has an opening surface portion on a bottom surface side thereof, and a base unit 60 which closes the opening surface portion of the antenna case 50 through intermediation of a pad 52 made of a soft resin. The antenna case 50 is formed in a streamline shape to become thinner and lower as approaching a front (toward a tip end), and to have side surfaces having curved surfaces which are curved toward an inner side (toward a center axis in the longitudinal direction). A material and a size of the antenna case 50 are substantially the same as the antenna case 10 of the first embodiment.

The base unit 60 includes a conductive base 61, and an insulating base 63 configured to fix the conductive base 61. Holes 611 and 612, through which cables C51, C53, C54, and C57 pass, are formed at a front and a rear of the conductive base 61. Meanwhile, in the insulating base 63, a mounting hole 631 is formed, through which the conductive base 61 is screwed to be fixed from the vehicle roof side, and holes 632 and 633 are formed, through which the cables C51, C53, C54, and C57 pass. On a back surface (a lower surface) of the insulating base 63, grooves configured to accommodate a metal spring 64 and a soft sealing member 65 are respectively formed. The metal spring 64 is deformed to follow a shape (curvature) of the vehicle roof shape. That is, similar to the first embodiment, the metal spring 64 firstly suppresses an amount of variation in capacitance C (amount of variation of a frequency "f" at unnecessary resonance) so that the antenna device 5 can be mounted to a vehicle roof having various curvatures, and secondly can shift a frequency "f" at unnecessary resonance outside a band in specifications. As a result, an application range, in which a sufficient antenna gain can be obtained, of the vehicle roof can be expanded. The base unit 60 is tightened with a bolt from the vehicle roof side (not shown in the drawings), and is locked with a nut 66.

The antenna unit includes an SDARS antenna 54, a telephone antenna 57, an AM/FM antenna 53, and a keyless entry antenna 51 arranged in line from a front in this order. The AM/FM antenna 53 is configured to include a pair of capacitance loading elements 531 and 532 electrically connected to each other through a coupling portion 533, and a helical element 535 which allows for receiving an FM broadcast since one end of the helical element 535 is electrically connected to the coupling portion 533. The pair of capacitance loading elements 531 and 532, and the coupling portion 533 are fixed to an element holder 534 as a hard insulating member, and is fixed to an inner wall of the antenna case 50 with a screw 5331. The helical element 535 is fixed to an inner wall of the antenna case 50 with a screw 5341 together with the element holder 534.

At a front of the capacitance loading elements 531 and 532, the telephone antenna 57 is arranged at a predetermined interval to be electrically discontinuous to each of the capacitance loading elements 531 and 532.

The telephone antenna 17 of the first embodiment is an antenna configured to transmit and receive signals of a frequency in 800 MHz band. Meanwhile, the telephone antenna 57 of the fifth embodiment is a planar conductive plate having substantially a p-shape in cross-section which is formed by an upper portion folded back along an inner wall of the antenna case 50, and has an element width larger than the telephone antenna 17. Accordingly, bandwidth can be widened, and transmission and reception can be performed at a frequency in 700 MHz band. The telephone antenna 57 is fixed to the inner wall of the antenna case 50 with a screw 571. A parasitic element 55 substantially in a rectangular shape for the SDARS is arranged at a front of the telephone antenna 57. The parasitic element 55 is fixed to the inner wall of the antenna case 50 with a screw 551.

A keyless entry substrate 510 in which electronic circuit components are respectively mounted on insulating members, an AM/FM substrate 530, and a telephone substrate 570 are screwed to be fixed on the conductive base 61. Another end (feeding portion) of the helical element 535 is conductive under a state to be elastically held by a circuit contact of the AM/FM substrate 530. The circuit contact is electrically connected to electronic circuit components such as an amplifier mounted on the AM/FM substrate 530. The electronic circuit components on the AM/FM substrate 530 are electrically connected to an electronic device at a vehicle side via the cable C53. A feeding portion of the telephone antenna 57 is conductive under a state to be elastically held by a circuit contact of the telephone substrate 570. The circuit contact is electrically connected to electronic circuit components mounted on the telephone substrate 570. Therefore, the electronic circuit components are electrically connected to the electronic device at the vehicle side via the cable C57.

The keyless entry antenna 51 is formed (erected) on the keyless entry substrate 510. The keyless entry antenna 51 is an antenna having a cylindrical holder 511, which is formed of an insulator, and a linear conductor 512 is wound therearound, to receive signals at a frequency in 900 MHz band. A Feeding portion of the keyless entry antenna 51 is electrically connected to electronic circuit components of the keyless entry substrate 510. The electronic circuit components of the keyless entry substrate 510 are electrically connected to the electronic device at the vehicle side via the cable C51.

The keyless entry antenna 51 is positioned to be electrically discontinuous to the pair of capacitance loading elements 531 and 532 behind the helical element 535 in a longitudinal direction of the AM/FM antenna 53. The keyless entry antenna 51 is arranged at the rearmost in the antenna unit of the antenna device 5, thereby, for example, horizontally polarized waves as well as vertically polarized waves can be satisfactorily received on the rear side of the vehicle roof, and a gain in the horizontal direction can be improved.

An area of the conductive base 61 is larger than areas of the capacitance loading elements 531 and 532 when viewed from above. That is, the area of the conductive base 61 is larger than a projected area of the capacitance loading elements 531 and 532. Further, since the keyless entry antenna 51 is arranged below the capacitance loading elements 531 and 532, the keyless entry antenna 51 can be securely grounded. Still further, since a gap between the capacitance loading elements 531 and 532, and the conductive base 61 is constant, reception performance in AM/FM band is not influenced by the curvature of the vehicle roof A ground plate 56 to be a ground of the SDARS antenna 54 is fixed at a front of the insulating base 63. The SDARS antenna 54 is electrically connected to the electronic device at the vehicle side via the cable C54. Shapes in detail of the parasitic element 55, the SDARS antenna 54, and the ground plate 56, and a positional relationship therebetween are described later.

As described above, the telephone antenna 57 and the keyless entry antenna 51 use close frequencies. Therefore, the AM/FM antenna 53 is interposed therebetween to physically separate those members, whereby interference can be decreased. Meanwhile, a frequency band of the AM/FM antenna 53 is far away from frequencies of the telephone antenna 57 and the keyless entry antenna 51. Therefore, even when the AM/FM antenna 53 and the telephone antenna 57, and the AM/FM antenna 53 and the keyless entry antenna 51 are positioned to be physically close to each other, it is possible to be able to make those members work well without any trouble in each frequency band. The keyless entry antenna 51 is arranged behind and below the capacity loading elements 531 and 532, but is not limited thereto.

Figure 17:
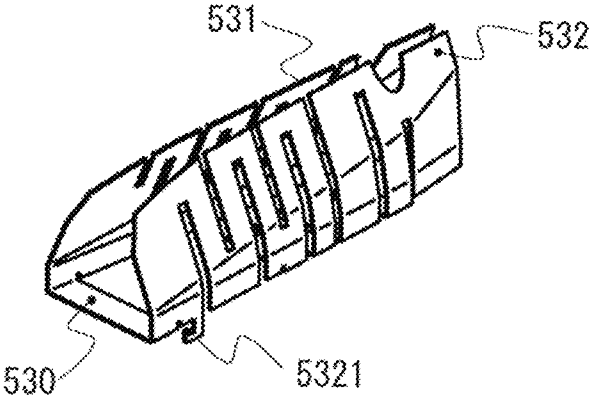
FIG. 17 shows an external perspective view of capacitance loading elements according to the fifth embodiment.
Figure 18:
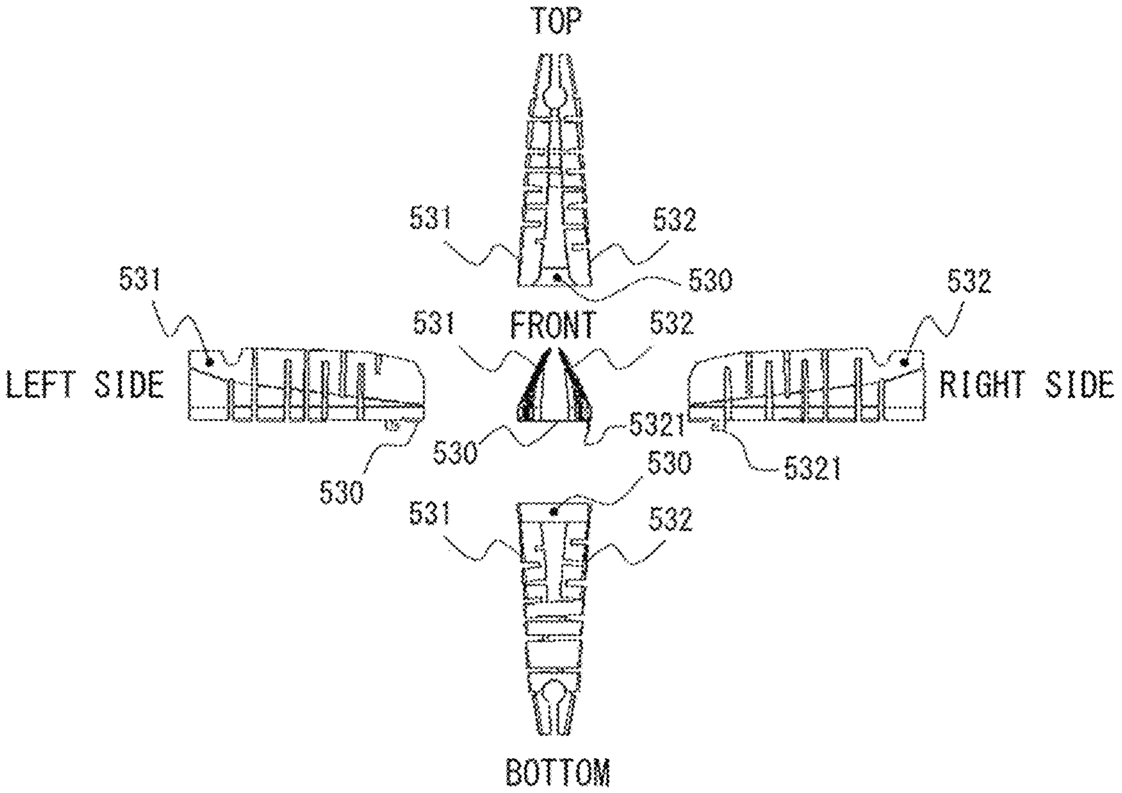
FIG. 18 shows front, top, left side, right side and bottom views of shapes of the capacitance loading elements.

Next, the capacitance loading elements 531 and 532 forming the AM/FM antenna 53 is explained in detail. FIG. 17 is an external perspective view of the capacitance loading elements 531 and 532. Further, FIG. 18 shows a front view, a top view, a left side view, a right side view, and a bottom view for illustrating shapes of the capacitance loading elements 531 and 532. The capacitance loading elements 531 and 532 are separated from each other at a pair of upper edges, and other portions are integrally formed to include the coupling portion 530 at lower edges. That is, the coupling portion 530 also includes an electrical delay unit.

A locking portion 5321 is formed at a portion of the capacitance loading elements 531 and 532, for example, at a lower portion of the capacitance loading element 532. The locking portion 5321 is formed to lock the capacitance loading elements 531 and 532 to a coupling portion 533.

The capacitance loading elements 531 and 532, including the coupling portion 530, a majority of which is formed in a meandering shape. That is, the portions in the meandering shape of the capacitance loading element 531 and 532 are more than those of the capacitance loading elements 131 and 132 of the first embodiment, and, therefore electrical lengths of the capacitance loading elements 531 and 532 are different from the electrical lengths of the capacitance loading elements 131 and 132 of the first embodiment. The electrical lengths of the capacitance loading elements 531 and 532 of the fifth embodiment are lengths which do not resonate in a frequency band used in the telephone antenna 57 (about between 700 MHz and 800 MHz) and the keyless entry antenna 51, and is longer than a wavelength in a frequency band used by the SDARS antenna 54. That is, the electrical lengths of the capacitance loading elements 531 and 532 are lengths which do not resonate in a frequency band used by the SDARS antenna 54. Thus, interference can be reduced between the capacitance loading elements 531 and 532, the telephone antenna 57 and the keyless entry antenna 51. Further, degradation (Ripple) of directivity in a horizontal plane of the SDARS antenna 54 can be suppressed.

Figure 19:
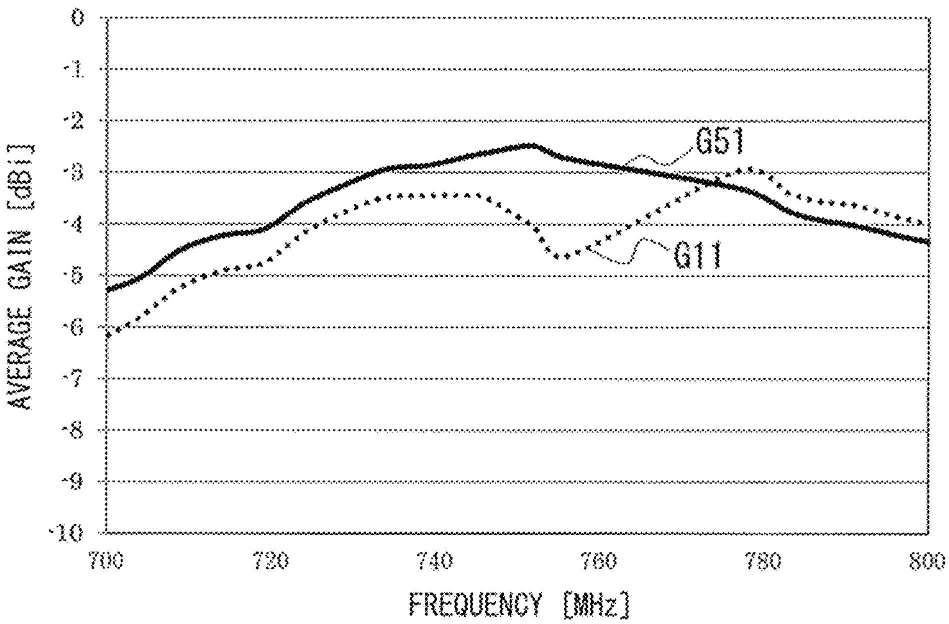
FIG. 19 shows a graph for showing a relationship between an average gain and a frequency characteristic of a telephone antenna according to the first and fifth embodiments.

An example of a result is shown in FIG. 19, in which a difference in characteristics between the telephone antenna 17 of the first embodiment and the telephone antenna 57 of the fifth embodiment was verified. FIG. 19 is a graph of a simulation showing a relationship between a frequency (between 700 MHz and 800 MHz) and an average gain (dBi). In FIG. 19, a broken line indicates an average gain G11 of the telephone antenna 17, and a solid line indicates an average gain G51 of the telephone antenna 57. As shown in FIG. 19, the telephone antenna 57 has a high average gain from 700 MHz to around 780 MHz as compared to the telephone antenna 17. Accordingly, it can be seen that the capacitance loading elements 531 and 532 of the fifth embodiment reduce interference which influences the telephone antenna 57 more than the capacitance loading elements 131 and 132 of the first embodiment.

Figure 20:
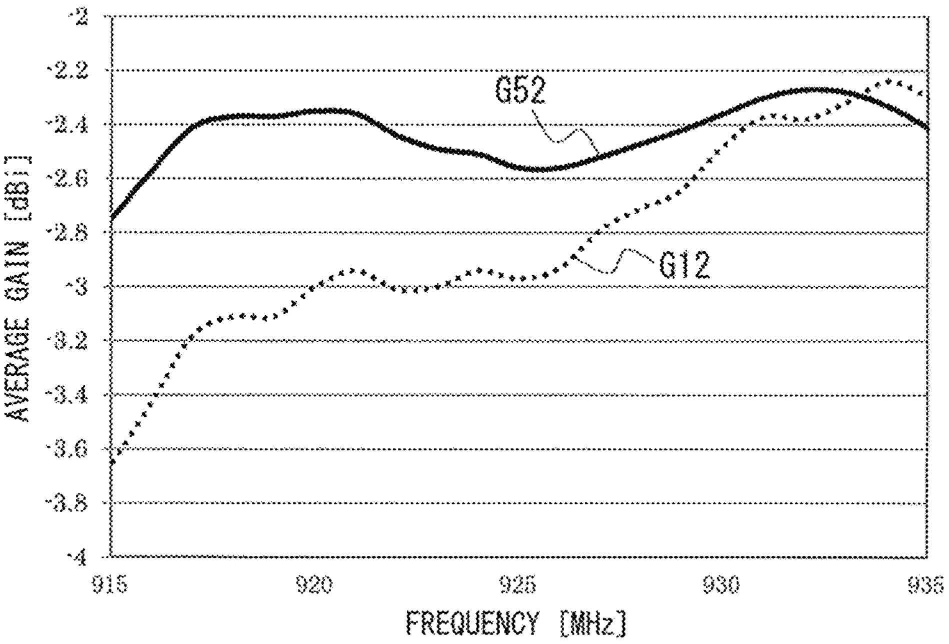
FIG. 20 shows a graph for showing a relationship between an average gain and a frequency characteristic of a keyless entry antenna.

FIG. 20 is a graph of a simulation showing a relationship between a frequency (from 915 MHz to 935 MHz) of the keyless entry antenna 51 and an average gain (dBi). In FIG. 20, a broken line indicates an average gain G12 of the keyless entry antenna 51 when the capacitance loading elements 131 and 132 of the first embodiment are used in place of the capacitance loading elements 531 and 532. On the other hand, in FIG. 20, a solid line indicates an average gain G52 of the keyless entry antenna 51 when the capacitance loading elements 531 and 532 are used. As shown in FIG. 20, since the capacitance loading elements 531 and 532 are used, the average gain of the keyless entry antenna 51 is increased. That is, the keyless entry antenna 51 is less susceptible to interference by the capacitance loading elements 531 and 532. The keyless entry antenna 51 uses a frequency in a narrow band, there is no problem even when the keyless entry antenna 51 has a low height. Therefore, in the fifth embodiment, even when the number of media (antenna) is increased, a length of the antenna device 5 in the front-back directions is not made so much longer than that of the antenna device 1 of the first embodiment by arranging the keyless entry antenna 51 below the capacitance loading elements 531 and 532.

Figure 21:
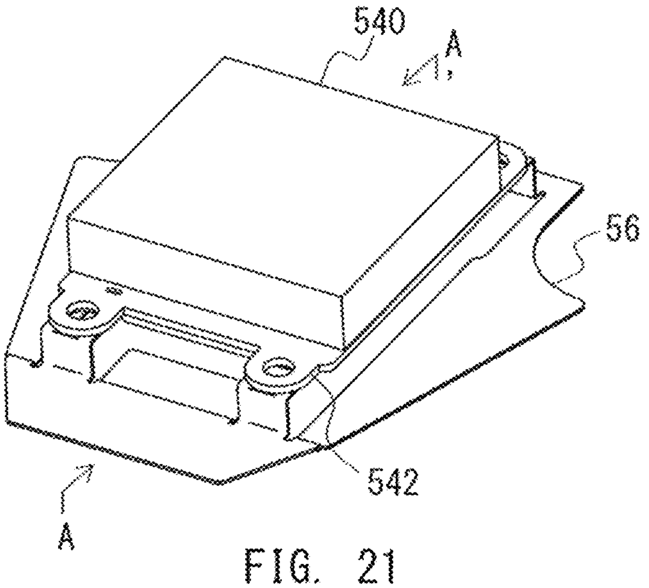
FIG. 21 shows an external perspective view of an SDARS antenna according to the fifth embodiment.
Figure 22:
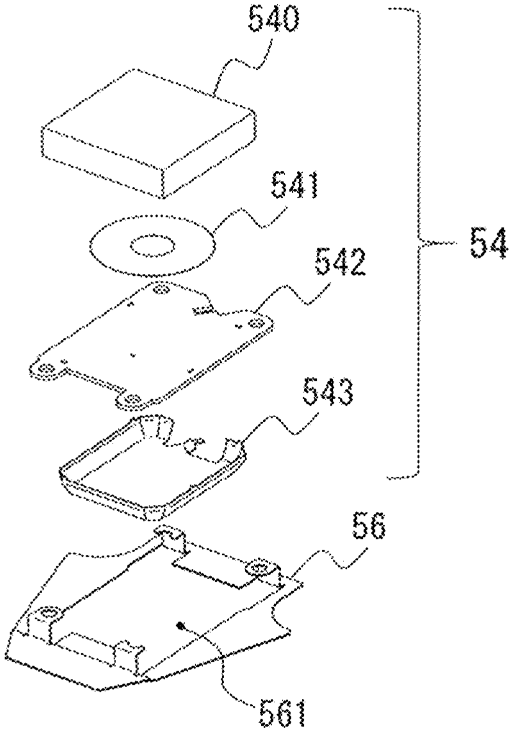
FIG. 22 shows an explanatory view of an arrangement of components forming the SDARS antenna of FIG. 21.
Figure 23:
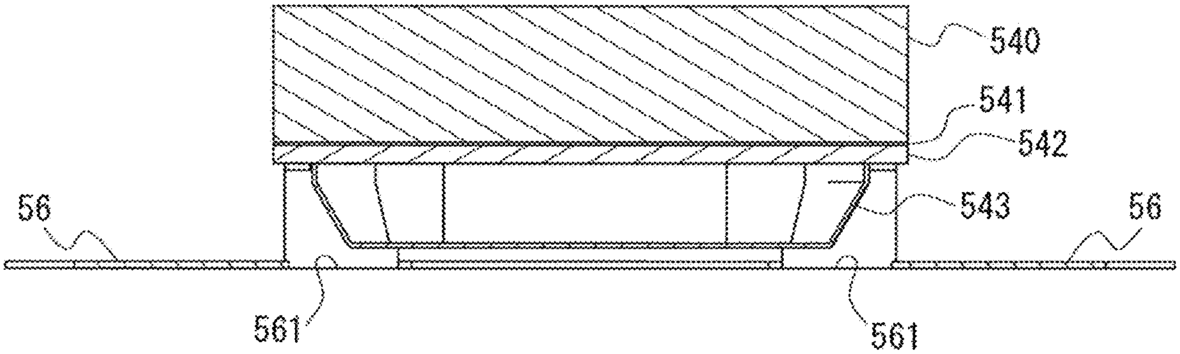
FIG. 23 shows a sectional view taken along the line A-A' of FIG. 21.

Next, the SDARS antenna 54 of the fifth embodiment is explained in detail. FIG. 21 is an external perspective view of the SDARS antenna 54. FIG. 22 is an explanatory view for illustrating arrangements of components forming the SDARS antenna 54. FIG. 23 is a sectional view taken along the line A-A' of FIG. 21.

The SDARS antenna 54 includes a planar antenna 540 as a main antenna. The planar antenna 540 is fixed with a double-sided tape 541 to a surface (an upper surface) of an SDARS substrate 542. Electronic circuit components such as an amplifier are mounted on a back surface (a lower surface) of the SDARS substrate 542, and are shielded with a shield cover 543. The shield cover 543 is screwed to be fixed to the ground plate 56 having holes 561 in a central portion. The points that the ground of the SDARS antenna 54 is spaced apart from the vehicle roof with a predetermined distance, and is electrically isolated from the grounds of other antennas, which are configured to receive radio waves other than the frequency band of the SDARS antenna 54, are the same as the antenna device 1 of the first embodiment.

Figure 24:
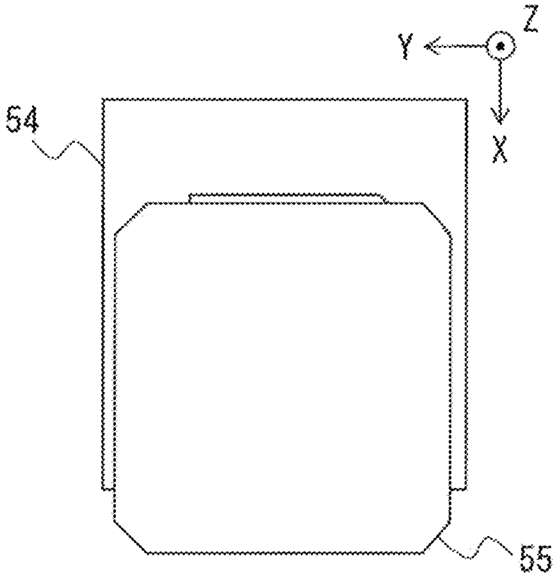
FIG. 24 shows a view for illustrating a positional relationship between a parasitic element for an SDARS and an antenna body.

A positional relationship between the parasitic element 55 for the SDARS and the SDARS antenna 54 (antenna body 540) when the antenna case 50 is covered with the base unit 60 is illustrated in FIG. 24. In FIG. 24, a direction (Z) away from the drawing sheet is an upper end direction of the antenna device 5, a downward direction (X) in the drawing sheet is a rear direction of the antenna device 5, and a left direction (Y) in the drawing sheet is a width direction of the antenna device 5. As illustrated in FIG. 24, the parasitic element 55 is arranged to be shifted rearward (X-direction) with respect the SDARS antenna 54. Therefore, an influence on antenna characteristics, which is caused by presence of the telephone antenna 57 and the like at a rear of the SDARS antenna 54, can be suppressed.

Figure 25:
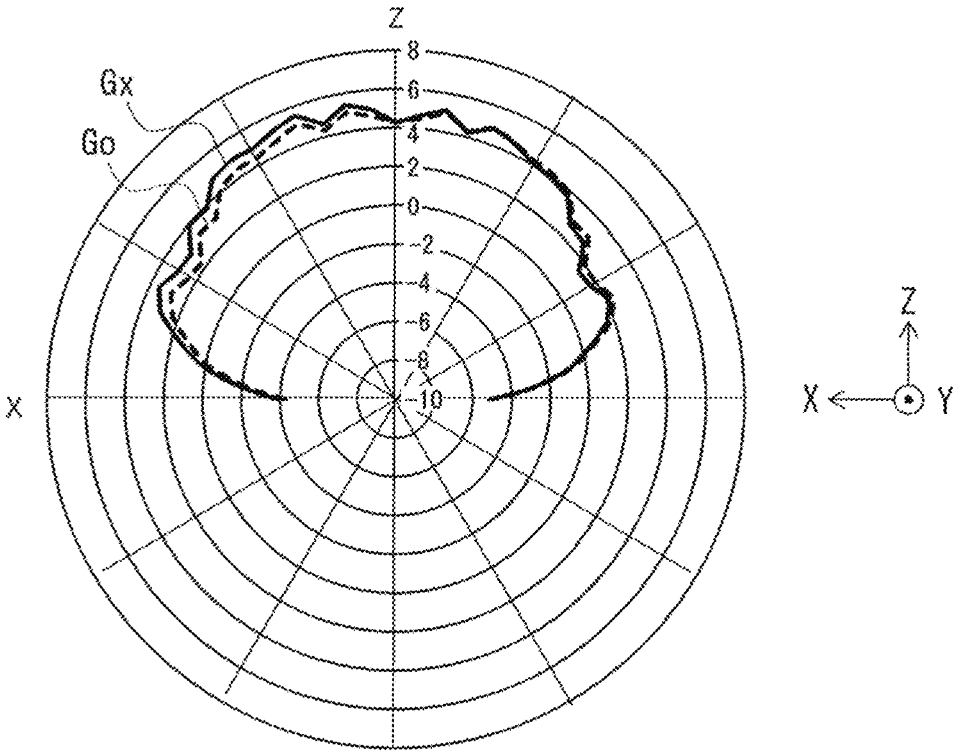
FIG. 25 shows a graph of a simulation for showing a variation in gain due to a direction of an SDARS antenna.

FIG. 25 is a graph of a simulation for showing a gain variation due to a direction of the SDARS antenna 54. In FIG. 25, a broken line indicates a gain when the parasitic element 55 is not shifted, and a solid line indicates a gain when the parasitic element 55 is shifted. As illustrated in FIG. 25, it can been seen that directivity Gx of the SDARS antenna 54 when the parasitic element is shifted to the rear (X-direction) is not significantly changed compared to directivity Go when the parasitic element is not shifted, but the gain in the rear (X-direction) becomes higher in the direction in which the parasitic element 55 is shifted (X-direction).

Figure 26:
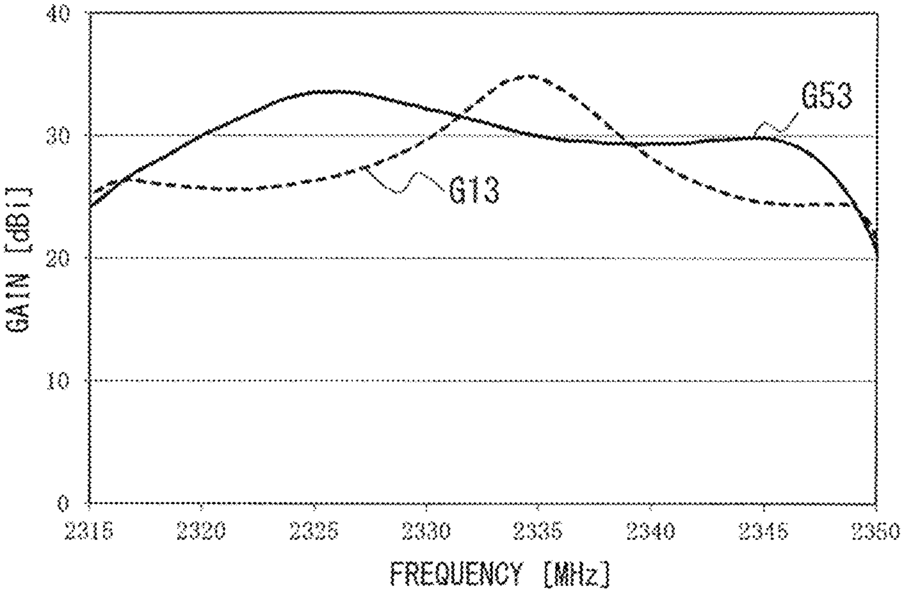
FIG. 26 shows a graph for showing a relationship between a gain and a frequency characteristic of the SDARS antenna.

The SDARS antenna 54 of the fifth embodiment is different from the SDARS antenna 14 of the first embodiment in that the holes 561 are formed at the central portion of the ground plate 56 in addition that the parasitic element 55 is shifted rearward (X-direction). That is, in the SDARS antenna 54, the shield cover 543 and the ground plate 56 are hard to be coupled, and a distance between the planar antenna 540 and the vehicle roof can be shorter than a distance between the planar antenna 143 of the first embodiment and the vehicle roof FIG. 26 is a graph of actual measurement for illustrating a relationship between frequencies in 2.3 GHz band and a gain of the SDARS antenna 14 in the first embodiment and the SDARS antenna 54 in the fifth embodiment. In FIG. 26, a broken line indicates a gain G13 of the SDARS antenna 14, and a solid line indicates a gain G53 of the SDARS antenna 54. An average of the gain G13 of the SDARS antenna 14 at a frequency between 2,320 MHz to 2,345 MHz (for SDARS) was 28.7 dBi, and an average of the gain G53 of SDARS antenna 54 was 31.0 dBi. Thus, it can be seen that the SDARS antenna 54 has the higher average gain than the SDARS antenna 14 at a frequency in 2.3 GHz band.

Sixth Embodiment

Figure 27:
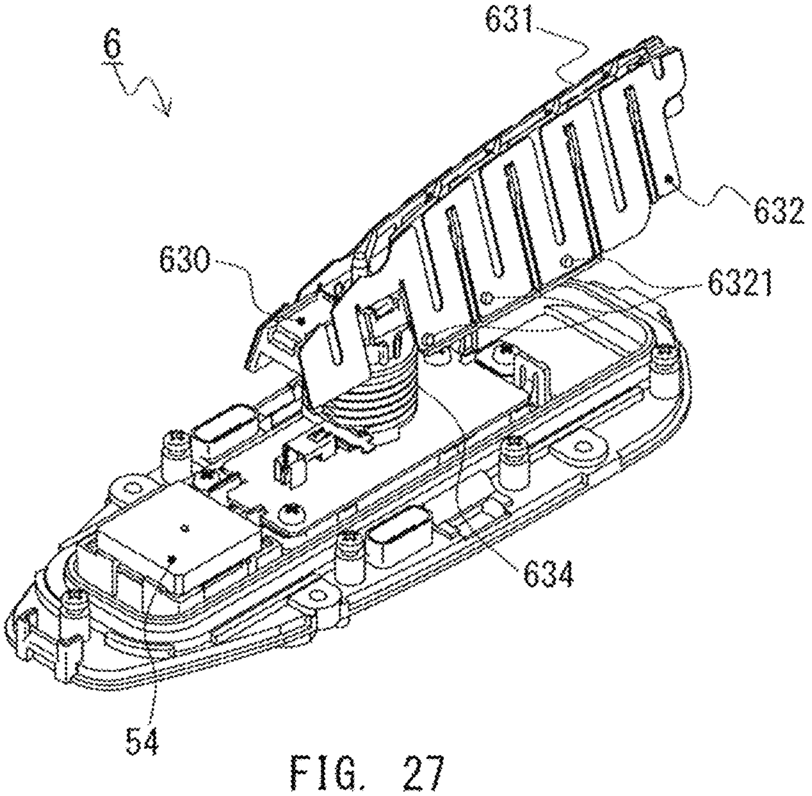
FIG. 27 shows an external perspective view of an antenna unit of an antenna device according to a sixth embodiment of the present disclosure.
Figure 28:
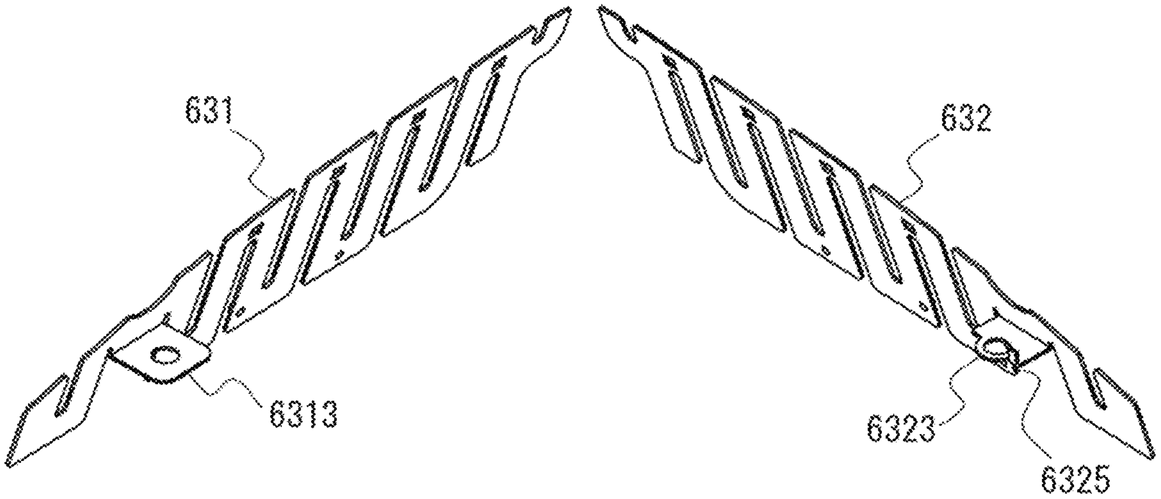
FIG. 28 shows explanatory views of structures of the capacitance loading elements.
Figure 29:
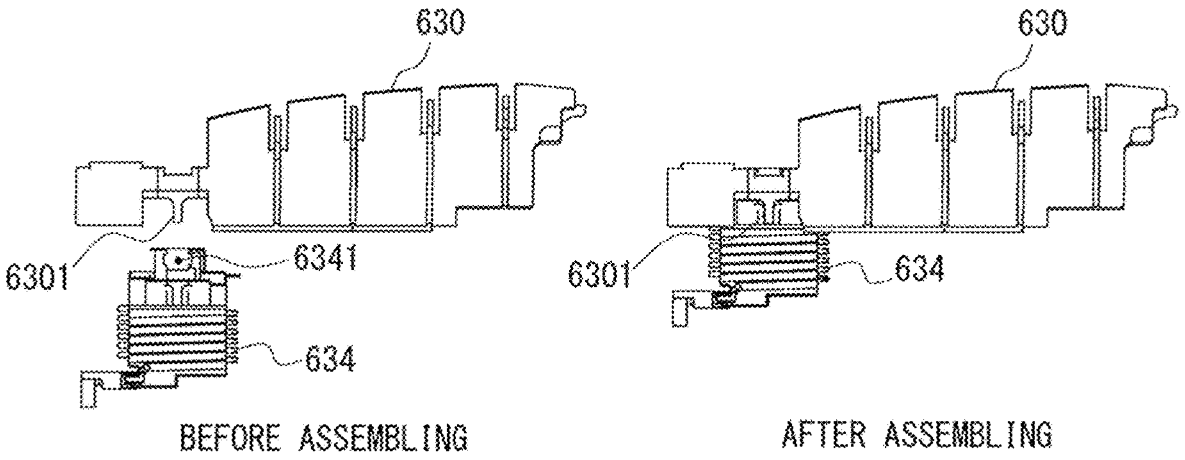
FIG. 29 shows explanatory views of a helical coil and an element holder before assembling and after assembling.

Next, a sixth embodiment of the present disclosure is described. In the sixth embodiment, a modification example of the mounting structure of the AM/FM antenna is illustrated. FIG. 27 is an external perspective view of an antenna unit of an antenna device 6 according to the sixth embodiment. FIG. 28 shows explanatory views of the structure of capacitance loading elements of the antenna device 6. FIG. 29 shows explanatory views of a procedure to attach a helical coil to an element holder, a state before assembling and a state after assembling is illustrated.

The antenna device 6 of the sixth embodiment includes cushions 6321 provided at one or a plurality of portions in a gap between a pair of capacitance loading elements 631 and 632, and an inner wall of the antenna case to fill the gap. The cushions 6321 may be, for example, embossed and protruded from an inner side of the capacitance loading element 632, or may be provided on the inner wall of the antenna case. Further, coupling portions 6313 and 6323 extending from the capacitance loading elements 631 and 632 are formed to be placed on each other in the upper-lower directions when mounted to the element holder 630, respectively. Still further, one coupling portion between the coupling portions 6313 and 6323 to be placed on an upper side, that is, the coupling portion 6323 in this embodiment includes a protrusion 6325.

In FIG. 27, only cushions 6321 of the one capacitance loading element 632 are illustrated, but cushions similar to the cushions 6321 are also formed in another capacitance loading element 631 which cannot be seen in FIG. 27. Those cushions 6321 fill the gap to the inner wall of the antenna case upon completion of assembly. That is, the cushions 6321 are brought into contact with the antenna case. Therefore, it is possible to prevent abnormal noise from being occurred by vibration of the capacitance loading elements 631 and 632 due to vibration of the vehicle after the antenna device 6 is mounted to the vehicle.

To ensure electrical connection between the pair of capacitance loading elements 631 and 632, and the one helical element 634, the coupling portions 6313 and 6323 are placed on each other in the upper-lower directions, and the protrusion 6325 is provided to prevent an error in directions in which the coupling portions 6313 and 6323 are placed. That is, when the coupling portion 6323 is placed under the coupling portion 6313 by mistake, the shapes of the capacitance loading elements 631 and 632 are distorted, or distances from one end of the helical element 634 to an end of each of the capacitance loading elements 631 and 632 are different. The protrusion 6325 is provided to prevent occurrence of such a situation.

The element holder 630 includes a guide in a predetermined thickness having a double-sided surface portion at a predetermined portion at a front, and a protrusion 6301 is formed on one surface portion (in this example, in the left direction) of the guide. The guide in the predetermined thickness having the double-sided surface portion is also provided at an upper end portion of the cylindrical holder of the helical element 634, and a groove 6341, into which the protrusion 6301 is fitted, is formed on the one surface portion (in this example, in the left direction).

Before assembling, as illustrated in FIG. 29, the protrusion 6301 of the element holder 630 is positioned above the groove 6341 of the helical element 634. Then, the protrusion 6301 is fitted into the groove 6341 as illustrated in FIG. 29. With the mounting structure like this, the helical element 134 is prevented from being assembled erroneously in the front-back directions. Further, the helical element 634 is less liable to rotate with respect to the element holder 630 so that another end (feeding portion) of the helical element is securely held by the circuit contact of the AM/FM substrate 530.

According to the present disclosure, an antenna device capable of reducing floating capacity even being in reduced in size and having a low height, and capable of incorporating antennas for other media without hindrance is provided.

According to the present disclosure, the edges (upper edges, side edges, and lower edges) of the capacitance loading elements are separated from each other, and hence the surface to be parallel to the vehicle roof is open. Consequently, although capacitance to ground is added to the helical element by the capacitance loading elements, the floating capacity is decreased. Therefore, the gains of the AM broadcast and the FM broadcast are improved. Further, the edges of the facing capacitance loading elements are discontinuous from each other so that the interference with the radio waves received by the antennas for other media can be suppressed.

According to the present disclosure, in one aspect, there is provided an antenna device to be mounted to a vehicle roof, including: a case unit having an accommodating space formed therein and having a radio wave permeability; and an antenna unit to be accommodated in the accommodating space, wherein the antenna unit includes: a pair of capacitance loading elements facing across a plane, as a center, perpendicular to the vehicle roof at a predetermined interval and at a predetermined angle to each other; a coupling portion provided at a portion lower than an upper edge of the pair of the capacitance loading elements to conduct each of the pair of capacitance loading elements each other via each of the coupling portions; and a helical element electrically connected to the coupling portions.

In the above aspect, at least one of the pair of the capacitance loading elements may include an electrical delay unit.

In the above aspect, the electrical delay unit may be formed into at least one of a meandering shape, a shape having at least one folded portion, a zigzag shape, a winding shape, and a fractal shape.

In the above aspect, the helical element may be configured to transmit or receive radio waves in first frequency bands; and the antenna unit may further include at least one antenna configured to transmit or receive radio waves in frequency bands other than the first frequency bands.

Alternatively, one of the at least one antenna configured to transmit or receive radio waves in frequency bands other than the first frequency bands may be a second antenna which is configured to transmit or receive radio waves in second frequency bands other than the first frequency bands, and the second antenna may be formed at a portion at which edges of the pair of capacitance loading elements are discontinuous.

Alternatively, one of the at least one antenna may be configured to transmit or receive radio waves in frequency bands other than the first frequency bands may be a planar antenna configured to transmit or receive radio waves in a frequency band having a shorter wavelength than the first frequency bands, and wherein each of the pair of capacitance loading elements may have a length of an edge in a first direction perpendicular to the vehicle roof and a length of an edge in a second direction parallel to the vehicle roof, which may be formed in such a manner that each of the lengths of the edges is configured to suppress interference with the radio waves in the frequency bands received by the planar antenna.

The pair of capacitance loading elements may be formed of a composite element including a front portion situated at a front in the first direction, an electrical delay unit, and a rear portion situated at a rear in the first direction, and wherein the front portion and the rear portion are electrically isolated in a specific frequency band.

Each of the lengths of the edges of the front portion and the rear portion in the first direction and the second direction may be about ¼ or less with respect to wavelengths of radio waves in the specific frequency band.

One of the radio waves in the specific frequency band may be a radio wave to be used by the planar antenna, and wherein a ground of the planar antenna may be separated from the vehicle roof by a predetermined distance, and may be electrically isolated from grounds of antennas configured to receive radio waves other than the frequency band to be used by the planar antenna.

The predetermined distance may be 10 mm or less.

In the above aspect, the antenna device may comprise a base unit configured to hold the case unit and to close the accommodating space.

The base unit may include a recessed portion in which an electric component of the antenna device is accommodated and a wall portion for electrically shielding the recessed portion.

The base unit may include a conductive base configured to have the same potential as the vehicle roof at a time of mounting, and an insulating base configured to hold the conductive base, wherein the insulating base may be configured to hold the planar antenna, and wherein the conductive base may be configured to hold antennas other than the planar antenna.

In the above aspect, the antenna device may further comprise a parasitic element provided at an inner side of the case unit; wherein the parasitic element may be arranged to face the planar antenna and to be shifted with respect to the planar antenna when the case unit and the base unit are fitted together.

In the above aspect, the antenna device may further comprise a holder to engage the pair of capacitance loading elements, wherein: each of the pair of capacitance loading elements may include a hole; the holder may include a locking claw; and the pair of capacitance loading elements may be locked to the holder by fitting the locking claw into the hole.

In the above aspect, the helical element may be eccentrically provided at one side of the pair of capacitance loading elements.

In the above aspect, the antenna device may further comprise a matching circuit provided at a feeding point of the second antenna such that impedance of the antenna becomes higher in the first frequency bands as compared with the second frequency bands In the above aspect, the antenna device may further comprise a cushion provided at a gap between the pair of capacitance loading elements and the case unit for filling the gap.

In the above aspect, the case unit may include an antenna case having a height of about 70 mm or less, which protrudes from the vehicle roof, and wherein the pair of capacitance loading elements may have a shape corresponding to an inner space of the antenna case.

In the above aspect, the case unit may be formed of an antenna case having a height of about 70 mm or less, which protrudes from the vehicle roof, and an inner case provided inside the antenna case, and wherein the pair of capacitance loading elements may have shapes corresponding an outer wall of the inner case.

What is claimed is:

1. An antenna device configured to be attached to a vehicle, comprising:

a case having an accommodating space formed therein and having a radio wave permeability; and an antenna portion configured to be accommodated in the accommodating space, wherein the antenna portion comprises:

an antenna having a capacitance loading element; and two communication system antennas arranged such that the antenna having the capacitance loading element is interposed between the two communication system antennas, wherein at least one of the two communication system antennas is arranged below the capacitance loading element, and wherein the bandwidth of the frequencies used by the communication system antenna arranged below the capacitance loading element is narrow.

2. The antenna device according to claim 1, wherein the two communication system antennas use frequencies within substantially the same frequency band.

3. The antenna device according to claim 1, further comprising a satellite system antenna, wherein the satellite system antenna is arranged in the accommodating space and at front side of the vehicle with respect to both the antenna having the capacitance loading element and the two communication system antennas.

4. The antenna device according to claim 3, wherein the satellite system antenna is arranged at a front of the telephone antenna, and the antenna having the capacitance loading element is arranged at a rear of the telephone antenna.

5. The antenna device according to claim 3, wherein the loading capacitance element includes an electrical delay circuit.

6. The antenna device according to claim 5, wherein the electrical delay circuit is formed into at least one of a meandering shape, a shape having at least one folded portion, a zigzag shape, a winding shape, and a fractal shape.

7. The antenna device according to claim 1, wherein at least one of the two communication system antennas is a telephone antenna.

8. The antenna device according to claim 1, wherein at least one of the two communication system antennas is arranged at a rearmost portion of the vehicle in the accommodating space.

9. The antenna device according to claim 1, wherein an electrical length of the capacitance loading element is a length that does not resonate in a frequency band used by the two communication system antennas.

10. The antenna device according to claim 1, wherein an electrical length of the capacitance loading element is a length which does not resonate either in a frequency band used by at least one of the two communication system antennas or in a frequency band of the satellite system antenna.

* * * * *